US012632719B2

(12) United States Patent
Zhang et al.

(10) Patent No.: US 12,632,719 B2
(45) Date of Patent: May 19, 2026

(54) OPTICAL COMPUTING APPARATUS AND SYSTEM, AND COMPUTING METHOD

(71) Applicant: HUAWEI TECHNOLOGIES CO., LTD., Shenzhen (CN)

(72) Inventors: Jiaxu Zhang, Hong Kong (CN); Jiang Xu, Hong Kong (CN); Zhifei Wang, Hong Kong (CN); Xuanqi Chen, Hong Kong (CN); Shixi Chen, Hong Kong (CN); Xiaowen Dong, Shenzhen (CN); Shaobo Ji, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 937 days.

(21) Appl. No.: 17/896,143

(22) Filed: Aug. 26, 2022

(65) Prior Publication Data

US 2022/0414442 A1      Dec. 29, 2022

Related U.S. Application Data

(63) Continuation of application No. PCT/CN2021/078233, filed on Feb. 26, 2021.

(30) Foreign Application Priority Data

Feb. 28, 2020    (CN) .......................... 202010127941.7

(51) Int. Cl.
  *H04B 10/00*       (2013.01)
  *G06F 7/544*       (2006.01)
  (Continued)
(52) U.S. Cl.
  CPC ........... *G06N 3/067* (2013.01); *G06F 7/5443* (2013.01)

(58) Field of Classification Search
  CPC ..... G06N 3/0464; G06N 3/067; G06N 3/0675
  See application file for complete search history.

(56) References Cited

U.S. PATENT DOCUMENTS

| 10,268,232 B2 | 4/2019 | Harris et al. |
| 2019/0019100 A1 | 1/2019 | Roques-Carmes et al. |
| (Continued) | | |

FOREIGN PATENT DOCUMENTS

| CN | 107196713 A | 9/2017 |
| CN | 109639359 A | 4/2019 |
| (Continued) | | |

OTHER PUBLICATIONS

Cem A et al:"Comparison of Models for Training Optical Matrix Multipliers in Neuromorphic PICs",2022 Optical Fiber Communications Conference and Exhibition (OFC),OSA,Mar. 6, 2022 (Mar. 6, 2022), pp. 1-3, XP034109716.

(Continued)

*Primary Examiner* — Daniel G Dobson

(57) ABSTRACT

An optical computing apparatus and system and a computing method are provided. The optical computing apparatus includes a linear operation module, a first delay module, and a coupler. The linear operation module can modulate, based on received electrical signals, optical signals input to the linear operation module; the first delay module may adjust a delay of optical signals output by the linear operation module; and after the first delay module adjusts the delay of the optical signals output by the linear operation module, the coupler may combine a plurality of groups of optical signals successively output by the linear operation module, to output one group of optical signals used to indicate a computing result that is obtained after a multiply-add operation is performed on one group of data and weights.

15 Claims, 22 Drawing Sheets

(51) Int. Cl.
 *G06N 3/067* (2006.01)
 *H04J 14/00* (2006.01)

(56) References Cited

U.S. PATENT DOCUMENTS

| | | |
|---|---|---|
| 2019/0370652 A1 | 12/2019 | Shen et al. |
| 2021/0405682 A1* | 12/2021 | Gould .................... H03H 17/06 |
| 2023/0152667 A1* | 5/2023 | Miscuglio ............... G06E 3/005 |
| | | 359/107 |
| 2023/0353252 A1* | 11/2023 | Bunandar ............ G06N 3/0675 |
| 2024/0345616 A1* | 10/2024 | Zhang ..................... G06E 3/005 |

FOREIGN PATENT DOCUMENTS

| | | |
|---|---|---|
| CN | 109784486 A | 5/2019 |
| CN | 109981172 A | 7/2019 |
| CN | 110247728 A | 9/2019 |
| CN | 110309916 A | 10/2019 |

OTHER PUBLICATIONS

Extended European Search Report issued in EP21760588.0, dated Jul. 7, 2023, 10 pages.
Mchen Shen et al: "Deep learning with coherent nanophotonic circuits", 2016, 8 pages.
Hengameh Bagherian et al, On-Chip Optical Convolutional Neural Networks, Aug. 16, 2018, 18 pages.
François Duport, Bendix Schneider, Anteo Smerieri, Marc Haelterman, and Serge Massar, "All-optical reservoir computing," Opt. Express 20, 22783-22795 (2012), 13 pages.
Jun Rong Ong et al, Photonic convolutional neural networks using integrated diffractive optics, IEEE Journal of Selected Topics in Quantum Electronics, vol. 26, No. 5, Sep./Oct. 2020 7702108, 8 pages.
International Search Report and Written Opinion issued in PCT/CN2021/078233, dated Jun. 2, 2021, 9 pages.

* cited by examiner

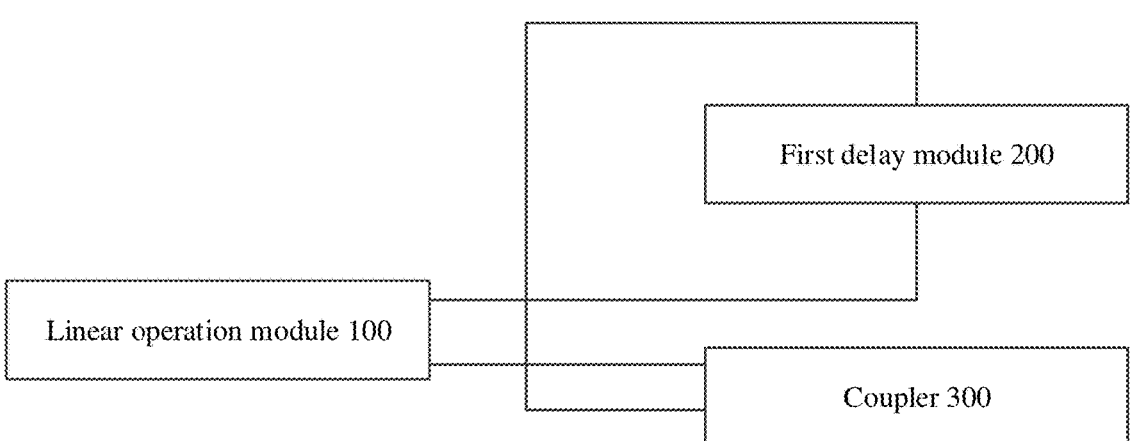
FIG. 1
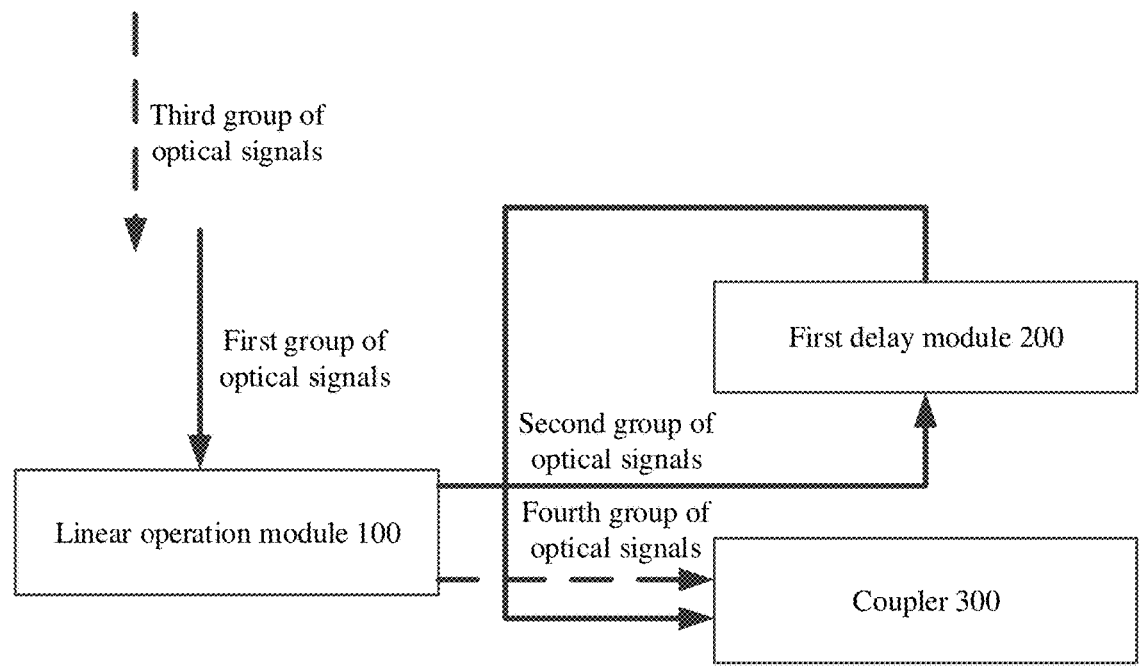
FIG. 2
$$X_{n1} = W_{11}X_{c1} + W_{21}X_{c2} + W_{31}X_{c3} + W_{41}X_{c4}$$
$$X_{n2} = W_{12}X_{c1} + W_{22}X_{c2} + W_{32}X_{c3} + W_{42}X_{c4}$$
$$X_{n3} = W_{13}X_{c1} + W_{23}X_{c2} + W_{33}X_{c3} + W_{43}X_{c4}$$
$$X_{n4} = W_{14}X_{c1} + W_{24}X_{c2} + W_{34}X_{c3} + W_{44}X_{c4}$$
| Input \ Output | $X_{n1}$ | $X_{n2}$ | $X_{n3}$ | $X_{n4}$ |
|---|---|---|---|---|
| $X_{c1}$ | $W_{11}$ | $W_{12}$ | $W_{13}$ | $W_{14}$ |
| $X_{c2}$ | $W_{21}$ | $W_{22}$ | $W_{23}$ | $W_{24}$ |
| $X_{c3}$ | $W_{31}$ | $W_{32}$ | $W_{33}$ | $W_{34}$ |
| $X_{c4}$ | $W_{41}$ | $W_{42}$ | $W_{43}$ | $W_{44}$ |
FIG. 3a Serial optical signals output to an optical computing apparatus First round ⟶ (Time segments 1–11) | Delay of $2*4\Delta_0$ | Second round ⟶ (Time segments 12–26)

Figure 13:
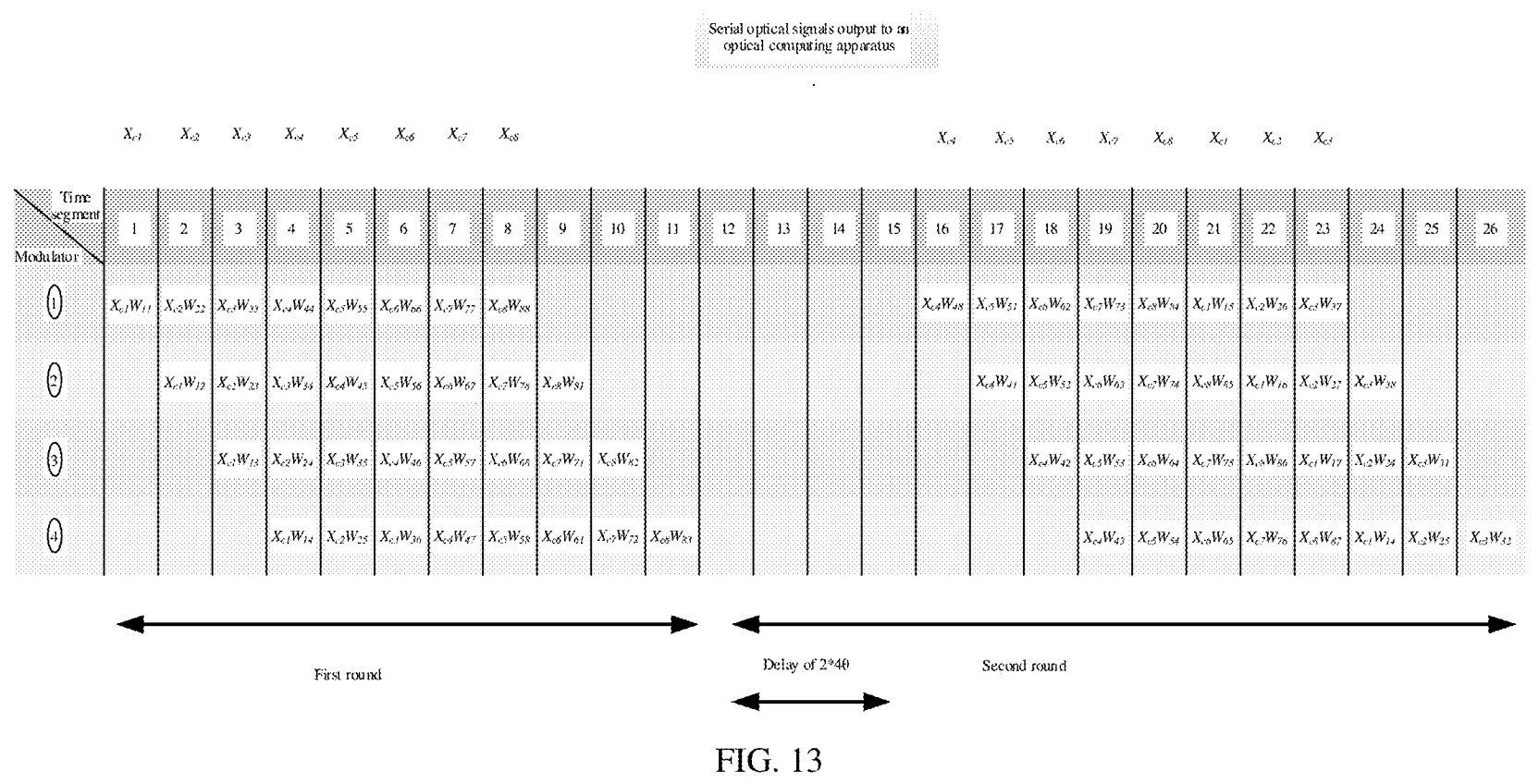

| Time segment / Modulator | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|
| ① | $X_{c1}W_{11}$ | $X_{c2}W_{22}$ | $X_{c3}W_{33}$ | $X_{c4}W_{44}$ | $X_{c5}W_{55}$ | $X_{c6}W_{66}$ | $X_{c7}W_{77}$ | $X_{c8}W_{88}$ | | | | | | | | $X_{c4}W_{48}$ | $X_{c5}W_{51}$ | $X_{c6}W_{62}$ | $X_{c7}W_{73}$ | $X_{c8}W_{84}$ | $X_{c1}W_{15}$ | $X_{c2}W_{26}$ | $X_{c3}W_{37}$ | | | |
| ② | | $X_{c1}W_{12}$ | $X_{c2}W_{23}$ | $X_{c3}W_{34}$ | $X_{c4}W_{45}$ | $X_{c5}W_{56}$ | $X_{c6}W_{67}$ | $X_{c7}W_{78}$ | $X_{c8}W_{81}$ | | | | | | | | $X_{c4}W_{41}$ | $X_{c5}W_{52}$ | $X_{c6}W_{63}$ | $X_{c7}W_{74}$ | $X_{c8}W_{65}$ | $X_{c1}W_{16}$ | $X_{c2}W_{27}$ | $X_{c3}W_{38}$ | | |
| ③ | | | $X_{c1}W_{13}$ | $X_{c2}W_{24}$ | $X_{c3}W_{35}$ | $X_{c4}W_{46}$ | $X_{c5}W_{57}$ | $X_{c6}W_{68}$ | $X_{c7}W_{71}$ | $X_{c8}W_{62}$ | | | | | | | | | $X_{c5}W_{53}$ | $X_{c6}W_{64}$ | $X_{c7}W_{75}$ | $X_{c8}W_{86}$ | $X_{c1}W_{17}$ | $X_{c2}W_{28}$ | $X_{c2}W_{71}$ | |
| ④ | | | | $X_{c1}W_{14}$ | $X_{c2}W_{25}$ | $X_{c3}W_{36}$ | $X_{c4}W_{47}$ | $X_{c5}W_{58}$ | $X_{c6}W_{61}$ | $X_{c7}W_{72}$ | $X_{c8}W_{83}$ | | | | | | | | $X_{c4}W_{43}$ | $X_{c5}W_{54}$ | $X_{c6}W_{65}$ | $X_{c7}W_{76}$ | $X_{c8}W_{67}$ | $X_{c1}W_{18}$ | $X_{c2}W_{25}$ | $X_{c3}W_{??}$ |

Operation transformation

| $a$ | $b$ |
|-----|-----|
| $c$ | $d$ |

| $X_{n1}$ | $X_{n2}$ |
|----------|----------|
| $X_{n3}$ | $X_{n4}$ |

| $X_{c1}$ | $X_{c2}$ | $X_{c3}$ |
|----------|----------|----------|
| $X_{c4}$ | $X_{c5}$ | $X_{c6}$ |
| $X_{c7}$ | $X_{c8}$ | $X_{c9}$ |

FIG. 14

| Input \ Output | $X_{n1}$ | $X_{n2}$ | $X_{n3}$ | $X_{n4}$ | $X_{n5}$ | $X_{n6}$ | $X_{n7}$ | $X_{n8}$ | $X_{n9}$ |
|---|---|---|---|---|---|---|---|---|---|
| $X_{c1}$ | d | c | | | | | | | |
| $X_{c2}$ | | d | c | | | | | | |
| $X_{c3}$ | | | d | c | | | | | |
| $X_{c4}$ | | | | d | c | | | | |
| $X_{c5}$ | | | | | d | c | | | |
| $X_{c6}$ | | | | | | d | c | | |
| $X_{c7}$ | | | | | | | d | c | |
| $X_{c8}$ | | | | | | | | d | c |
| $X_{c9}$ | c | | | | | | | | d |

FIG. 15a

| Input \ Output | $X_{n1}$ | $X_{n2}$ | $X_{n3}$ | $X_{n4}$ | $X_{n5}$ | $X_{n6}$ | $X_{n7}$ | $X_{n8}$ | $X_{n9}$ |
|---|---|---|---|---|---|---|---|---|---|
| $X_{c1}$ | d | c | | b | a | | | | |
| $X_{c2}$ | | d | c | | b | a | | | |
| $X_{c3}$ | | | d | c | | b | a | | |
| $X_{c4}$ | | | | d | c | | b | a | |
| $X_{c5}$ | | | | | d | c | | b | a |
| $X_{c6}$ | a | | | | | d | c | | b |
| $X_{c7}$ | b | a | | | | | d | c | |
| $X_{c8}$ | | b | a | | | | | d | c |
| $X_{c9}$ | c | | b | a | | | | | d |

FIG. 15b

| Input\Output | $X_{n1}$ | $X_{n2}$ | $X_{n3}$ | $X_{n4}$ | $X_{n5}$ | $X_{n6}$ | $X_{n7}$ | $X_{n8}$ | $X_{n9}$ |
|---|---|---|---|---|---|---|---|---|---|
| $X_{c1}$ | d | c |  | b | a |  |  |  |  |
| $X_{c2}$ |  | d | c |  | b | a |  |  |  |
| $X_{c3}$ |  |  | d | c |  | b | a |  |  |
| $X_{c4}$ |  |  |  | d | c |  | b | a |  |
| $X_{c5}$ |  |  |  |  | d | c |  | b | a |
| $X_{c6}$ | a |  |  |  |  | d | c |  | b |
| $X_{c7}$ | b | a |  |  |  |  | d | c |  |
| $X_{c8}$ |  | b | a |  |  |  |  | d | c |
| $X_{c9}$ | c |  | b | a |  |  |  |  | d |

FIG. 15c

| Output / Input | | | | | $X_{n5}$ | $X_{n6}$ | | $X_{n8}$ | $X_{n9}$ |
|---|---|---|---|---|---|---|---|---|---|
| $X_{c1}$ | | | | | a | | | | |
| $X_{c2}$ | | | | | b | a | | | |
| $X_{c3}$ | | | | | | b | | | |
| $X_{c4}$ | | | | | c | | | a | |
| $X_{c5}$ | | | | | d | c | | b | a |
| $X_{c6}$ | | | | | | d | | | b |
| $X_{c7}$ | | | | | | | | c | |
| $X_{c8}$ | | | | | | | | d | c |
| $X_{c9}$ | | | | | | | | | d |

Input signals

Output

OPTICAL COMPUTING APPARATUS AND SYSTEM, AND COMPUTING METHOD

CROSS-REFERENCE TO RELATED APPLICATIONS

This is a continuation of International Patent Application No. PCT/CN2021/078233, filed on Feb. 26, 2021, which claims priority to Chinese Patent Application No. 202010127941.7, filed on Feb. 28, 2020. The disclosures of the aforementioned applications are hereby incorporated by reference in their entireties.

TECHNICAL FIELD

This application relates to the field of information technologies, and in particular, to an optical computing apparatus and system and a computing method.

BACKGROUND

A neural network model such as a convolutional layer or a fully connected layer usually needs to perform a large quantity of data operations, and needs to store a large amount of process data in a data operation process. To increase an operation speed of the neural network model, an optical computing system may be used to implement the data operation process of the neural network model, to obtain a final operation result.

Optical computing systems may be divided into two categories by implementation forms thereof: spatial optical computing systems and on-chip optical computing systems. The spatial optical computing system mainly includes a 4F optical system, implements convolution operations by using Fourier optical transforms, and simulates a neural network model such as a convolutional neural network (CNN), but this category of optical computing systems has no advantages in both speed and volume. The on-chip optical computing system is based on a silicon-based photonic integration technology, and mainly uses optical devices such as a Mach Zehnder modulator (MZI) to build an optical multiplier-adder to implement convolution operations, but this category of optical computing systems includes a limited quantity of MZIs, and needs to perform a plurality of multiply-add iterations to implement multiply-add operations. In addition, the on-chip optical computing system uses a heating electrode to adjust phases of optical signals. As a result, the on-chip optical computing system is prone to thermal crosstalk. This reduces accuracy of operations, and makes efficiency of the entire on-chip optical computing system become relatively poor.

SUMMARY

This application provides an optical computing apparatus and system and a computing method, to provide an optical computing system with relatively high efficiency.

According to a first aspect, an embodiment of this application provides an optical computing apparatus. The optical computing apparatus includes a linear operation module, a first delay module, and a coupler.

The linear operation module may receive a first group of optical signals that is used to indicate a first group of data, and may further receive first electrical signals that indicate a first part of first weights. The linear operation module modulates the first group of optical signals based on the first electrical signals to output a second group of optical signals.

The second group of optical signals is used to indicate a computing result of the first group of data and the first part of the weights, and the first weights are weights of a first neural network layer.

Subsequently, the linear operation module may further receive a third group of optical signals that is used to indicate the first group of data, and second electrical signals that indicate a second part of the first weights. The linear operation module modulates the third group of optical signals based on the second electrical signals to output a fourth group of optical signals. The fourth group of optical signals is used to indicate a computing result of the first group of data and the second part of the weights.

The first delay module may adjust a delay of the second group of optical signals. Then, the coupler may combine the delayed second group of optical signals and the fourth group of optical signals into a fifth group of optical signals. The fifth group of optical signals indicates a first computing result that is obtained after multiply-add operations are performed on the first group of data and the first part of the weights and on the first group of data and the second part of the weights.

With the optical computing apparatus, the linear operation unit in the optical computing apparatus may successively receive a plurality of groups of optical signals and electrical signals, and cooperate with the coupler and the first delay module to output one group of optical signals that may indicate a computing result of a multiply-add operation. In the optical computing apparatus, different multiply-add operations can be implemented by only modulating the plurality of input groups of optical signals and the input electrical signals, and phases of optical signals can be adjusted in the optical computing apparatus without using a heating electrode, thereby ensuring accuracy of computing and further ensuring efficiency of the optical computing apparatus.

In a possible design, the optical computing apparatus may further include a filtering module. In addition to multiply-add operations, the optical computing apparatus may further implement pooling operations by using the filtering module. Description is provided by using an example in which the optical computing apparatus performs a pooling operation on a sixth group of optical signals. The linear operation module may receive the sixth group of optical signals, and third electrical signals that indicate second weights. The sixth group of optical signals is used to indicate a second computing result that is obtained after a multiply-add operation is performed on the first group of data and the first weights, the second computing result may include the first computing result, and the second weights are weights of a second neural network layer.

The linear operation module modulates the sixth group of optical signals based on the third electrical signals to output a seventh group of optical signals. The filtering module may receive the seventh group of optical signals, filter out an invalid signal from the seventh group of optical signals, and output an eighth group of optical signals. The eighth group of optical signals is used to indicate a computing result that is obtained after a pooling operation is performed on the second computing result.

With the optical computing apparatus, the optical computing apparatus can implement not only multiply-add operations but also pooling operations, improving versatility of the optical computing apparatus.

In a possible design, when the optical computing apparatus includes the filtering module, the optical computing apparatus may further implement a convolution operation by using the filtering module. Description is provided by using an example in which the optical computing apparatus performs a convolution operation on a ninth group of optical signals.

The linear operation module may receive the ninth group of optical signals, and fourth electrical signals that indicate third weights. The ninth group of optical signals is used to indicate a second group of data.

The linear operation module may modulate the ninth group of optical signals based on the fourth electrical signals to output a tenth group of optical signals. The tenth group of optical signals is used to indicate a third computing result that is obtained after a multiply-add operation is performed on the second group of data and the third weights, and the third weights are weights of a third neural network layer.

The filtering module receives the tenth group of optical signals, filters out an invalid signal from the tenth group of optical signals, and outputs an eleventh group of optical signals. The eleventh group of optical signals is used to indicate a computing result that is obtained after a convolution operation is performed on the third computing result.

With the optical computing apparatus, the optical computing apparatus can implement not only multiply-add operations but also convolution operations and pooling operations, further improving versatility of the optical computing apparatus and enabling the optical computing apparatus to implement relatively more operations in a neural network model.

In a possible design, the optical computing apparatus may further include a nonlinear operation module, to implement an activation function configured in the neural network model. The nonlinear operation module may perform a nonlinear operation on a signal output by the coupler, for example, the sixth group of optical signals, the fifth group of optical signals, the eighth group of optical signals, or the eleventh group of optical signals. The nonlinear operation is an activation function operation.

With the optical computing apparatus, in addition to multiply-add operations, convolution operations, and pooling operations, the optical computing apparatus can implement an activation function operation on computing results of a multiply-add operation, a convolution operation, and a pooling operation, ensuring versatility of the optical computing apparatus.

In a possible design, the optical computing apparatus may further include a dual-mode beam splitter. The dual-mode beam splitter can split one received group of optical signals that indicates one group of data into two same groups of optical signals that indicate the same group of data. For example, the dual-mode beam splitter may receive a twelfth group of optical signals that is used to indicate the first group of data, and split the twelfth group of optical signals into the first group of optical signals and the third group of optical signals.

With the optical computing apparatus, the dual-mode beam splitter disposed in the optical computing apparatus can split one group of optical signals into a plurality of groups of optical signals that indicate same data, without requiring that one group of optical signals indicating same data be input to the optical computing apparatus a plurality of times. Therefore, only one group of optical signals needs to be input, effectively improving computing efficiency of the optical computing apparatus and improving performance of the optical computing apparatus.

In a possible design, the optical computing apparatus further includes a second delay module. The dual-mode beam splitter may transmit the delayed second group of optical signals to the second delay module. The second delay module may adjust a delay of the second group of optical signals, so that the second group of optical signals and the fourth group of optical signals simultaneously arrive at the coupler.

With the optical computing apparatus, the coupler can simultaneously receive a plurality of groups of optical signals, and better obtain one group of optical signals through combining.

In a possible design, the linear operation module includes N optoelectronic modulators.

Any one of the N optoelectronic modulators may receive one optical signal in the first group of optical signals and one of the first electrical signals that are used to indicate the first part of the weights, and modulate the received optical signal based on the received electrical signal. Similarly, any optoelectronic modulator may further receive one optical signal in the third group of optical signals and one of the second electrical signals that are used to indicate the second part of the weights, and modulate the received optical signal based on the received electrical signal.

With the optical computing apparatus, the linear operation module can better implement multiply-add operations by using the N optoelectronic modulators, ensuring efficient operations of the optical computing apparatus.

In a possible design, the linear operation module further includes N phase modulators and (N–1) phase locking modules.

One of the phase modulators may be connected to one of the optoelectronic modulators. The phase modulator may adjust a phase of one optical signal that is in the first or second group of optical signals and that is modulated by the modulator. One of the phase locking modules may be connected to two of the N phase modulators, and is configured to lock phases of two optical signals that are in the first or second group of optical signals and that are modulated by the two phase modulators.

With the optical computing apparatus, the phase modulators can adjust phases of the optical signals and modulate symbols of data indicated by the optical signals, and the phase locking modules can ensure that the phase modulators can effectively adjust the phases of the optical signals.

In a possible design, the linear operation module further includes an amplifier. The amplifier may amplify powers of the fifth group of optical signals, the sixth group of optical signals, the eighth group of optical signals, or the eleventh group of optical signals.

With the optical computing apparatus, a loss of the optical signals in the optical computing apparatus can be reduced by using the amplifier.

According to a second aspect, this application provides a computing method. For beneficial effects, refer to relevant description in the first aspect. Details are not described herein again. The method is performed by an optical computing apparatus. The method includes the following.

A linear operation module receives a first group of optical signals and first electrical signals, where the first group of optical signals is used to indicate a first group of data, and the first electrical signals are used to indicate a first part of first weights. The linear operation module modulates the first group of optical signals based on the first electrical signals to output a second group of optical signals, where the second group of optical signals is used to indicate a computing result of the first group of data and the first part of the weights, and the first weights are weights of a first neural network layer.

The linear operation module receives a third group of optical signals and second electrical signals, where the third group of optical signals is used to indicate the first group of data, and the second electrical signals are used to indicate a second part of the first weights. The linear operation module modulates the third group of optical signals based on the second electrical signals to output a fourth group of optical signals, where the fourth group of optical signals is used to indicate a computing result of the first group of data and the second part of the weights.

A first delay module adjusts a delay of the second group of optical signals.

A coupler combines the delayed second group of optical signals and the fourth group of optical signals into a fifth group of optical signals, where the fifth group of optical signals indicates a first computing result that is obtained after multiply-add operations are performed on the first group of data and the first part of the weights and on the first group of data and the second part of the weights.

In a possible design, the linear operation module receives a sixth group of optical signals, and third electrical signals that are used to indicate second weights, where the sixth group of optical signals is used to indicate a second computing result that is obtained after a multiply-add operation is performed on the first group of data and the first weights, the second computing result includes the first computing result, and the second weights are weights of a second neural network layer.

The linear operation module modulates the sixth group of optical signals based on the third electrical signals to output a seventh group of optical signals.

A filtering module receives the seventh group of optical signals, filters out an invalid signal from the seventh group of optical signals, and outputs an eighth group of optical signals, where the eighth group of optical signals is used to indicate a computing result that is obtained after a pooling operation is performed on the second computing result.

In a possible design, the linear operation module receives a ninth group of optical signals, where the ninth group of optical signals is used to indicate a second group of data.

The linear operation module receives fourth electrical signals that are used to indicate third weights, and modulates the ninth group of optical signals based on the fourth electrical signals to output a tenth group of optical signals, where the tenth group of optical signals is used to indicate a third computing result that is obtained after a multiply-add operation is performed on the second group of data and the third weights, and the third weights are weights of a third neural network layer.

The filtering module receives the tenth group of optical signals, filters out an invalid signal from the tenth group of optical signals, and outputs an eleventh group of optical signals, where the eleventh group of optical signals is used to indicate a computing result that is obtained after a convolution operation is performed on the third computing result.

According to a third aspect, this application provides an optical computing system. The optical computing system may include a processor and the optical computing apparatus according to any one of the first aspect or the possible designs of the first aspect. The processor is configured to transmit to-be-computed data to the optical computing apparatus, for example, a first group of data or a second group of data, or may transmit first weights or second weights.

According to a fourth aspect, this application provides a computer-readable storage medium. When the computer-readable storage medium is run by a computing device, the computing device performs the method provided in any one of the second aspect or the possible designs of the second aspect. The storage medium stores a program. The storage medium includes but is not limited to a volatile memory, for example, a random access memory, or a nonvolatile memory, such as a flash memory, a hard disk drive (HDD), and a solid state drive (SSD).

According to a fifth aspect, this application provides a computing device program product. The computing device program product includes computer instructions. When the computer instructions are executed by a computing device, the computing device performs the method provided in any one of the second aspect or the possible designs of the second aspect. The computer program product may be a software installation package. When the method according to any one of the second aspect or the possible implementations of the second aspect needs to be used, the computer program product may be downloaded to and executed on the computing device.

BRIEF DESCRIPTION OF DRAWINGS

FIG. 1 is a schematic diagram of a structure of an optical computing apparatus according to this application;

FIG. 2 is a schematic diagram of a transmission path of an optical signal according to this application;

FIG. 3a is a schematic diagram of a multiply-add operation according to this application;

FIG. 9b-1 and FIG. 9b-2 are schematic diagrams of a structure of a linear operation module according to this application;

FIG. 13 is a schematic diagram of a multiply-add operation according to this application;

FIG. 14 is a schematic diagram of a convolution operation according to this application;

FIG. 15a is a schematic diagram of input serial optical signals and output optical signals in a first linear operation process according to this application;

FIG. 15b is a schematic diagram of input serial optical signals and output optical signals in a second linear operation process according to this application;

FIG. 15c is a schematic diagram of optical signals filtered by a filtering module according to this application;

DESCRIPTION OF EMBODIMENTS

Figure 9A:
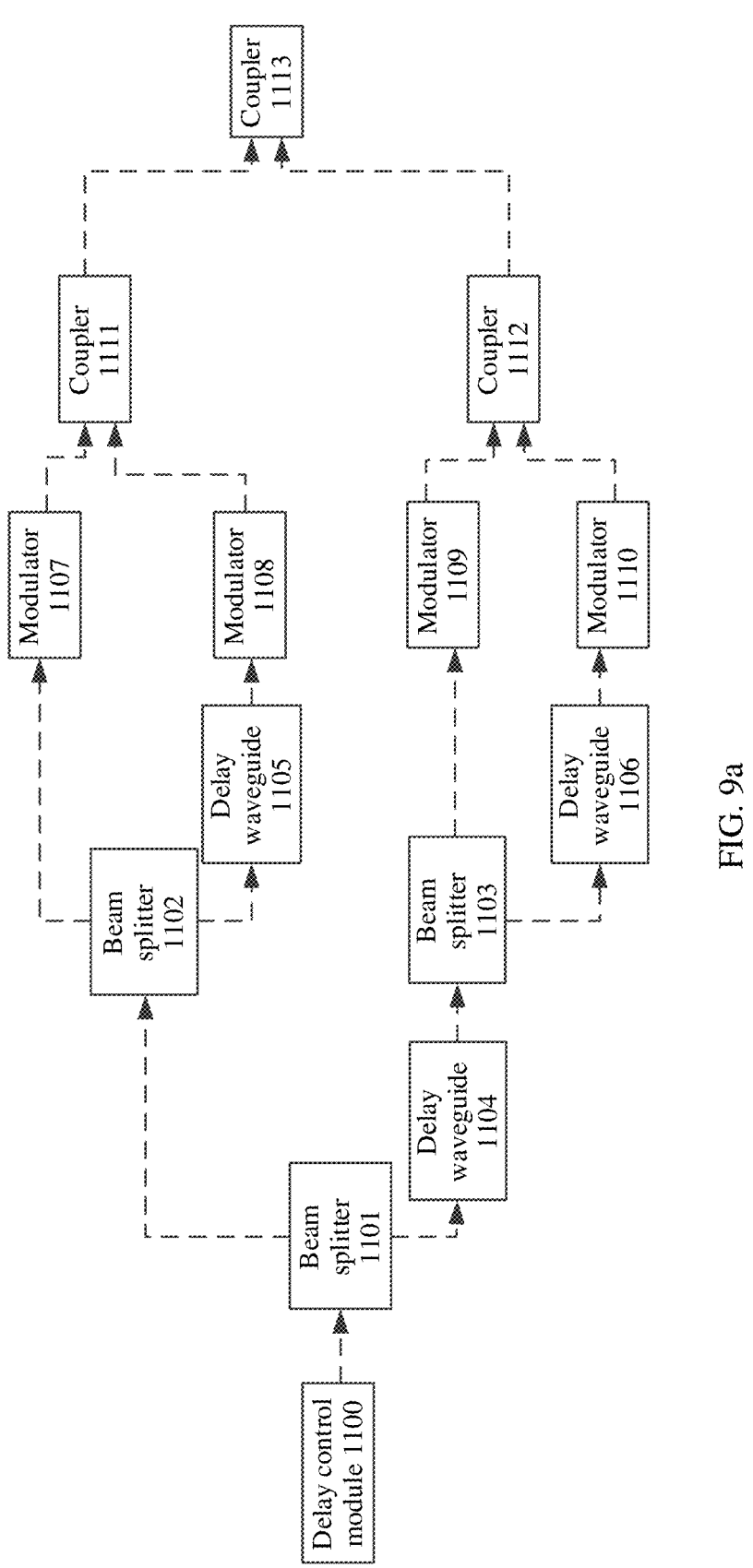
FIG. 9a is a schematic diagram of a structure of a linear operation module according to this application.
Figures 1, 9B:
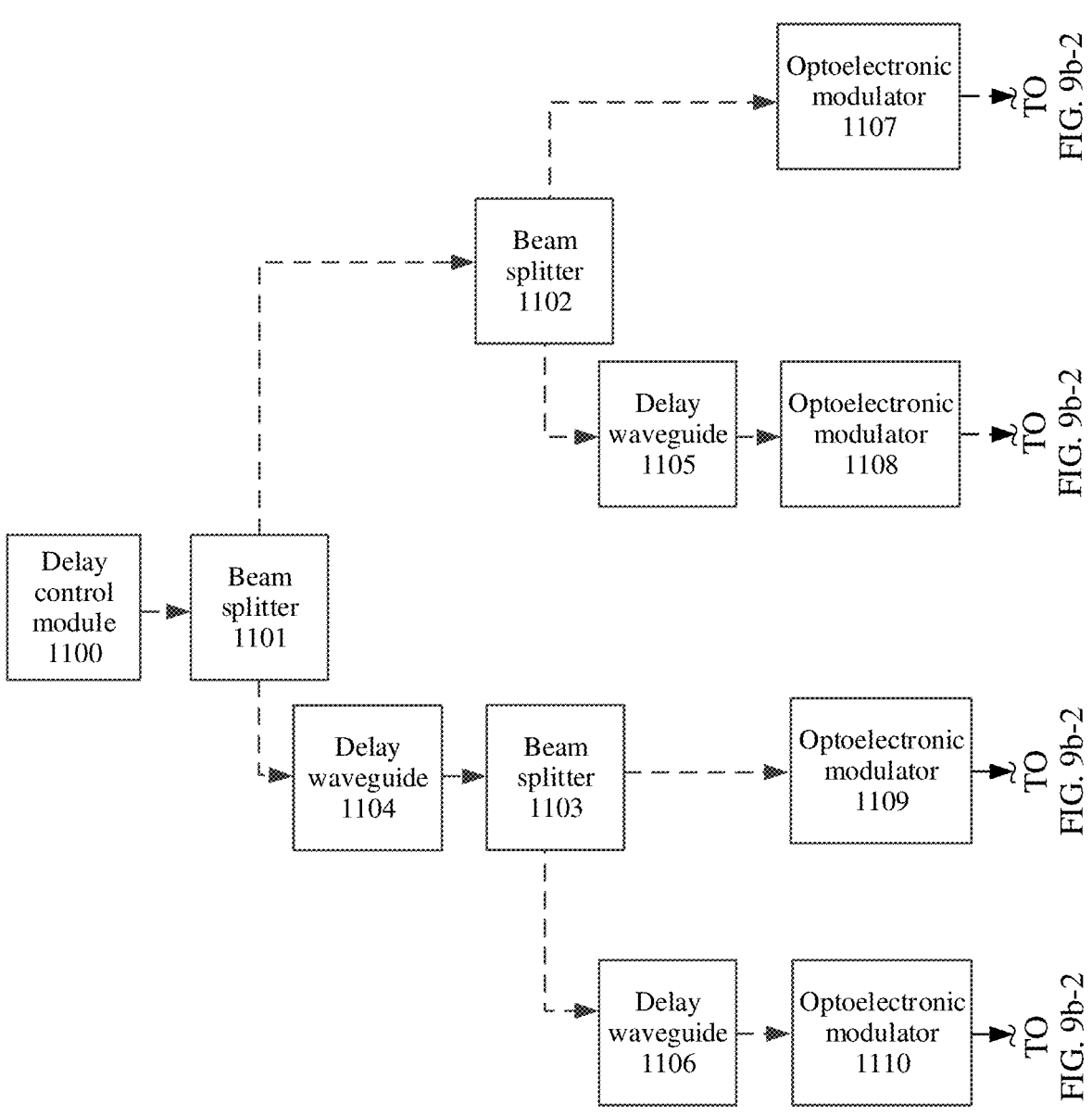

As shown in FIG. 1, an embodiment of this application provides an optical computing apparatus. The optical computing apparatus includes a linear operation module 100, a first delay module 200, and a coupler 300. A specific form of the optical computing apparatus is not limited in this embodiment. For example, the optical computing apparatus may be an optical computing chip.

In this embodiment, the linear operation module 100 can modulate, based on received electrical signals, optical signals input to the linear operation module 100; the first delay module 200 may adjust a delay of optical signals output by the linear operation module 100; and after the first delay module 200 adjusts the delay of the optical signals output by the linear operation module 100, the coupler 300 may combine a plurality of groups of optical signals successively output by the linear operation module 100, to output one group of optical signals used to indicate a computing result that is obtained after a multiply-add operation is performed on one group of data and weights.

The following describes an operation process in the optical computing apparatus by using an example in which two groups of optical signals successively received by the linear operation module 100 are a first group of optical signals and a third group of optical signals, respectively.

First, in a process of receiving the first group of optical signals that indicates a first group of data, the linear operation module 100 may further receive first electrical signals that are used to indicate a first part of first weights. The linear operation module 100 may modulate the first group of optical signals based on the first electrical signals, modulate light intensities of the first group of optical signals, and output a second group of optical signals. The output second group of optical signals may indicate a computing result of the first group of data and the first part of the weights. The first weights are weights set on a first neural network layer.

The linear operation module 100 can implement only a limited quantity of operations in one linear operation process for one optical signal, that is, the linear operation module 100 can output only an optical signal indicating a computing result that is obtained after a multiply-add operation is performed on the first group of data and a part of the weights (for example, the first part of the weights). If the linear operation module 100 needs to complete all operations, the linear operation module 100 needs to continue to receive a next group of optical signals to perform linear operations, so that the coupler 300 can subsequently combine a plurality of groups of different optical signals successively output by the linear operation module 100, to output one group of optical signals indicating a computing result that is obtained after a multiply-add operation is performed on the first group of data and the first weights.

To be distinguished from the first group of optical signals, optical signals that are used to indicate the first group of data and that are subsequently received by the linear operation module 100 are represented by, for example, the third group of optical signals.

In a process of receiving the third group of optical signals, the linear operation module 100 may further receive second electrical signals that are used to indicate a second part of the first weights. The linear operation module 100 may modulate the third group of optical signals based on the second electrical signals, modulate light intensities of the third group of optical signals, and output a fourth group of optical signals. The output fourth group of optical signals may indicate a computing result of the first group of data and the second part of the weights.

It can be learned from the foregoing description that the linear operation module 100 successively outputs the second group of optical signals and the fourth group of optical signals. Because there is a delay between the two groups of optical signals, the two groups of optical signals cannot be directly combined.

Therefore, the first delay module 200 may adjust a delay of the second group of optical signals. Then, after receiving the fourth group of optical signals and the delay-adjusted second group of optical signals, the coupler 300 may combine the fourth group of optical signals and the delayed second group of optical signals into a fifth group of optical signals. The fifth group of optical signals is used to indicate a computing result that is obtained after multiply-add operations are performed on the first group of data and the first part of the weights and on the first group of data and the second part of the weights.

The following describes transmission paths of the second group of optical signals and the fourth group of optical signals in the optical computing apparatus.

Figures 2, 9B:
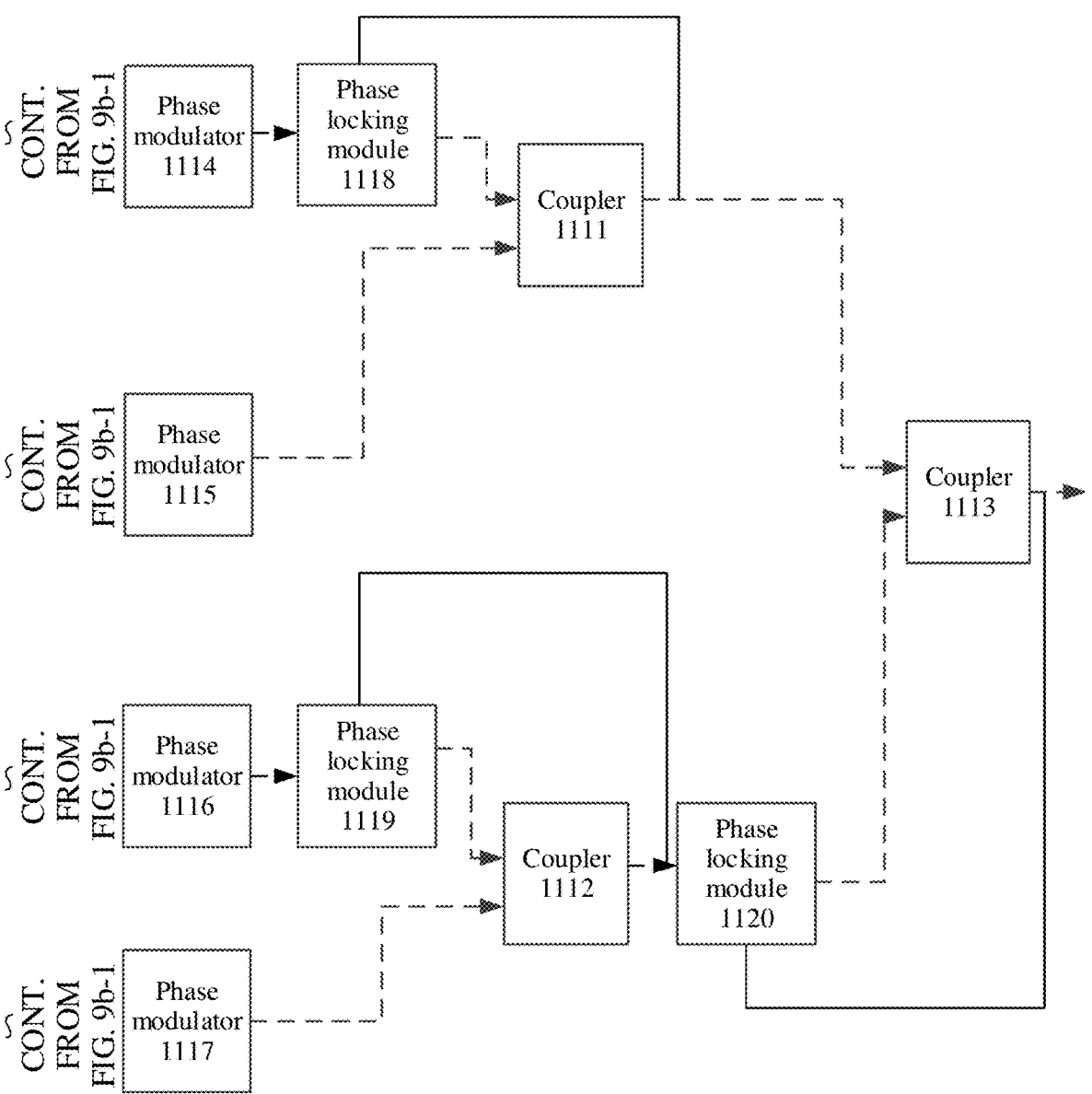

In FIG. 2, a black solid line is used to mark a transmission path 1 on which the second group of optical signals is transmitted after being output from the linear operation module 100. It can be learned from FIG. 2 that after being output from the linear operation module 100, the second group of optical signals is transmitted to the first delay module 200, and then output to the coupler 300 from the first delay module 200.

In FIG. 2, a black dashed line is used to mark a transmission path 2 on which the fourth group of optical signals is transmitted after being output from the linear operation module 100. It can be learned from FIG. 2 that after being output from the linear operation module 100, the fourth group of optical signals can be directly transmitted to the coupler 300.

In the optical computing apparatus shown in FIG. 1 and FIG. 2, the second group of optical signals may indicate the computing result that is obtained after a multiply-add operation is performed on the first group of data and the first part of the weights, and the fourth group of optical signals may indicate the result that is obtained after a multiply-add operation is performed on the first group of data and the second part of the weights. After the first delay module 200 adjusts the delay of the second group of optical signals, the coupler 300 completes, by coupling the delayed second group of optical signals and the fourth group of optical signals into the fifth group of optical signals, multiply-add operations performed on the first group of data and the first part of the weights and on the first group of data and the second part of the weights. In this way, an operation process at a fully connected layer is implemented.

Figures 3B, 4A, 4B:
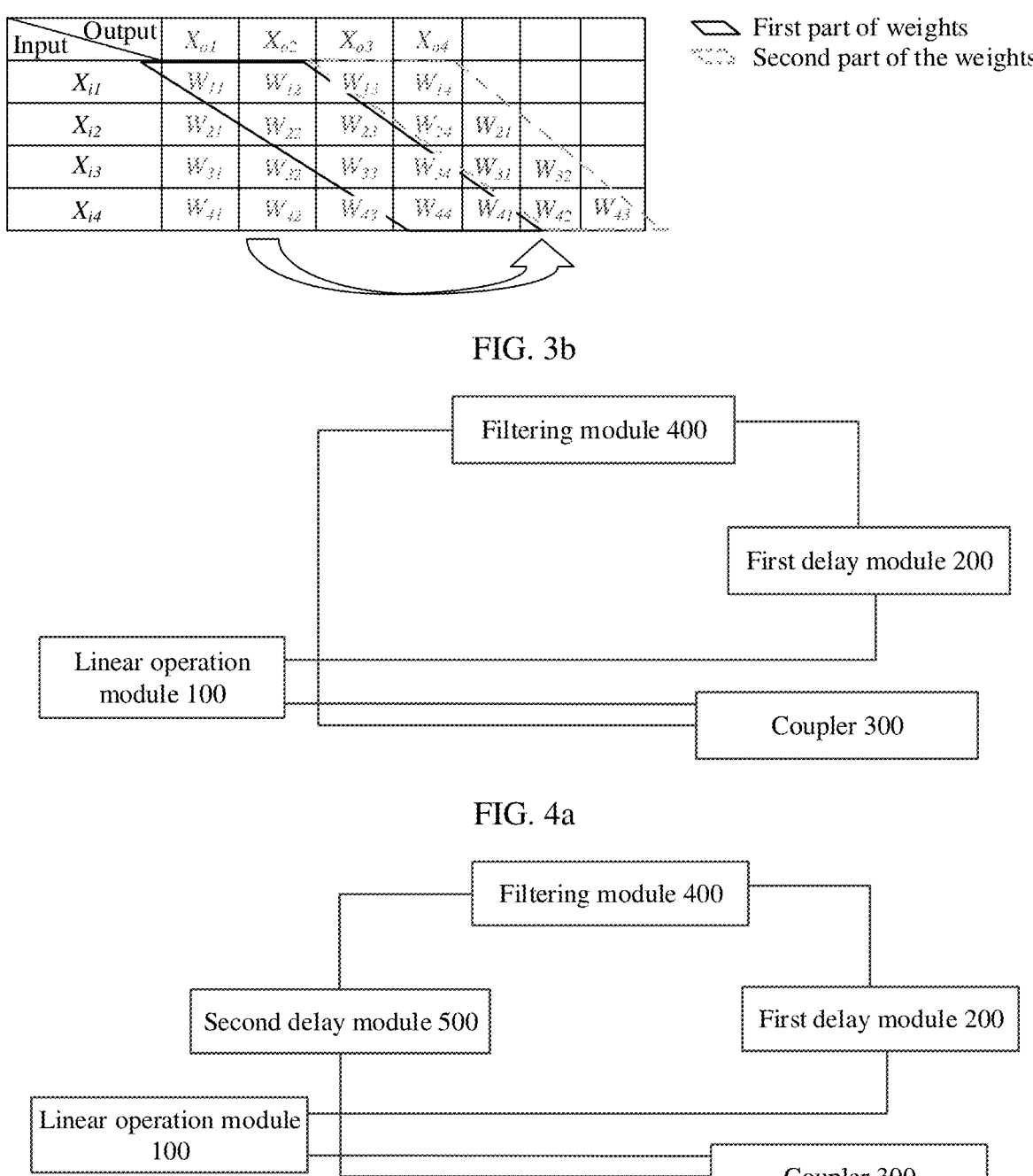
FIG. 3b is a schematic diagram of a first part of weights and a second part of the weights according to this application.
FIG. 4a is a schematic diagram of a structure of an optical computing apparatus according to this application.
FIG. 4b is a schematic diagram of a structure of an optical computing apparatus according to this application.

The following describes an operation at the fully connected layer that is performed by the optical computing apparatus. Referring to FIG. 3a, a left side of FIG. 3a shows a multiply-add operation that needs to be implemented at the fully connected layer. To be more intuitive, the multiply-add operation may be converted into a form of an array shown on a right side of FIG. 3a. The multiply-add operation is a 4×4 linear operation. Four pieces of input data ($X_{c1}$, $X_{c2}$, $X_{c3}$, and $X_{c4}$) are required, there are four pieces of output data ($X_{n1}$, $X_{n2}$, $X_{n3}$, and $X_{n4}$), and weights that need to be applied are $W_{11}$ to $W_{44}$. If the linear operation module 100 can perform only two different modulations on one optical signal each time (that is, the linear operation module 100 includes only two optoelectronic modulators), it can be learned from the multiply-add operation shown in FIG. 3a that four different modulations need to be performed on any piece of input data. $X_{c1}$ is used as an example. Four different modulations need to be performed on $X_{c1}$, to obtain $W_{11}$ $X_{c1}$, $W_{12}$ $X_{c1}$, $W_{13}$ $X_{c1}$, and $W_{14}$ $X_{c1}$. To complete the multiply-add operation shown in FIG. 3a, the linear operation module 100 needs to successively receive two groups of optical signals that indicate $X_{c1}$, $X_{c2}$, $X_{c3}$, and $X_{c4}$. For example, the two groups of optical signals are denoted as a first group of optical signals and a third group of optical signals. The linear operation module 100 further needs to successively receive first electrical signals indicating a first part of weights and second electrical signals indicating a second part of the weights. Referring to FIG. 3b, weights in a solid line box are the first part of the weights, and weights in a dashed line box are the second part of the weights. In this way, the linear operation module 100 can cooperate with the first delay module 200 and the coupler 300 to output a fifth group of optical signals that indicates $X_{n1}$, $X_{n2}$, $X_{n3}$, and $X_{n4}$.

It should be noted that the optical computing apparatus is described by using merely an example in which the linear operation module 100 receives two groups of optical signals that indicate the first group of data. If the first weights include a third part of the weights in addition to the first part of the weights and the second part of the weights, the linear operation module 100 may further continue to receive one group of optical signals that indicates the first group of data. In this case, the linear operation module 100 modulates the group of optical signals based on electrical signals that indicate the third part of the weights, and outputs one modulated group of optical signals; the first delay module 200 may delay the fifth group of optical signals; and the coupler 300 may combine the fifth group of optical signals and the modulated group of optical signals into one group of optical signals. Similarly, if the first weights further include a fourth part of the weights, the optical computing apparatus may further use a process similar to the foregoing process. To be specific, the linear operation module 100 continues to receive one group of optical signals that indicates the first group of data, and modulates the group of optical signals; the first delay module 200 delays the group of optical signals obtained through previous combining; and the coupler 300 combines one group of optical signals that is obtained after the first delay module 200 performs delaying, with one group of optical signals that is obtained after the linear operation module 100 performs modulation this time. The foregoing process is performed cyclically until multiply-add operations on the first group of data and the first weights are completed. In this embodiment, a sixth group of optical signals is used to indicate a computing result that is obtained after multiply-add operations are performed on the first group of data and the first weights.

The optical computing apparatus may further implement other operations of a neural network model, for example, a convolution operation at a convolutional layer and a pooling operation at a pooling layer. In a process of performing a convolution operation or a pooling operation, some data that does not need to participate in the operation, that is, invalid data, needs to be removed. Therefore, the optical computing apparatus may further include a filtering module 400. As shown in FIG. 4a, the filtering module 400 may be disposed on the transmission path of the second group of optical signals. The filtering module 400 may filter out, from one group of optical signals, some optical signals on which an operation does not need to be performed, that is, invalid signals. The invalid signals indicate invalid data. After the optical signals on which an operation does not need to be performed are filtered out, optical signals remaining in the group of optical signals are transmitted to the first delay module 200 along the transmission path of the second group of optical signals.

By using an example in which two groups of optical signals received by the linear operation module 100 in the optical computing apparatus are a first group of optical signals and a third group of optical signals, respectively, the following describes a transmission process of optical signals in the optical computing apparatus when the optical computing apparatus implements a pooling operation.

First, after the coupler 300 outputs the sixth group of optical signals (for a generation process of the sixth group of optical signals, reference may be made to the foregoing content, and details are not described herein again), the sixth group of optical signals is transmitted to the linear operation module 100 through the first delay module 200 and the filtering module 400.

The linear operation module 100 modulates the sixth group of optical signals based on received third electrical signals that indicate second weights, and outputs a seventh group of optical signals. The second weights are weights set on a second neural network layer (for example, the pooling layer).

Then, the seventh group of optical signals is transmitted to the filtering module 400 through the first delay module 200 (the first delay module 200 may not adjust the delay of the second group of optical signals). The seventh group of optical signals is transmitted to the filtering module 400. The filtering module 400 filters out an invalid signal from the seventh group of optical signals, and outputs optical signals remaining in the seventh group of optical signals, where the invalid signal is invalid data that needs to be deleted in the pooling operation. For ease of description, an eighth group of optical signals is used to indicate the optical signals remaining in the seventh group of optical signals. The eighth group of optical signals may indicate a final result that is obtained after the pooling operation is performed on the computing result, which is obtained after multiply-add operations are performed on the first group of data and the first weights.

The following provides description by using an example in which the optical computing apparatus implements a convolution operation. To be distinguished from the foregoing groups of optical signals and the electrical signals, the description is provided by using an example in which one group of optical signals received by the linear operation module 100 is a ninth group of optical signals, and electrical signals received by the linear operation module 100 are fourth electrical signals indicating third weights. The third weights are weights set on a third neural network layer (for example, the convolutional layer).

The linear operation module 100 modulates the ninth group of optical signals based on the received fourth electrical signals, modulates light intensities of the ninth group of optical signals, and outputs a tenth group of optical signals. The output tenth group of optical signals may indicate a computing result of second group of data and the third weights.

It should be noted herein that, description is provided herein merely by using an example in which the linear operation module 100 receives one group of optical signals and outputs the tenth group of optical signals. In actual operation, similar to a manner in which the linear operation module 100 cooperates with the first delay module 200 and the coupler 300 to output the sixth group of optical signals, the linear operation module 100 may alternatively receive a plurality of groups of optical signals successively, and cooperate with the first delay module 200 and the coupler 300 to obtain the tenth group of optical signals by cyclically performing linear operations a plurality of times.

The tenth group of optical signals is transmitted to the filtering module 400 through the first delay module 200 (the first delay module 200 may not adjust a delay of the tenth group of optical signals). The tenth group of optical signals is transmitted to the filtering module 400. The filtering module 400 filters out an invalid signal from the tenth group of optical signals, and outputs optical signals remaining in the tenth group of optical signals, where the invalid signal is invalid data that needs to be deleted in the convolution operation. For ease of description, an eleventh group of optical signals is used to indicate the optical signals remaining in the tenth group of optical signals. The eleventh group of optical signals may indicate a final result that is obtained after the convolution operation is performed on the second group of data.

It should be noted that the first neural network layer, the second neural network layer, and the third neural network layer in the foregoing content may be any neural network layer in any neural network model, and the first neural network layer and the second neural network layer may alternatively be two adjacent neural network layers in a neural network model.

Usually, transmission times of an optical signal on different transmission paths are different. To ensure that the second group of optical signals and the fourth group of optical signals simultaneously arrive at the coupler 300, the optical computing apparatus may further include a second delay module 500. As shown in FIG. 4*b*, the second delay module 500 may be placed on the transmission path of the second group of optical signals, to further adjust the delay of the second group of optical signals.

Figure 5:
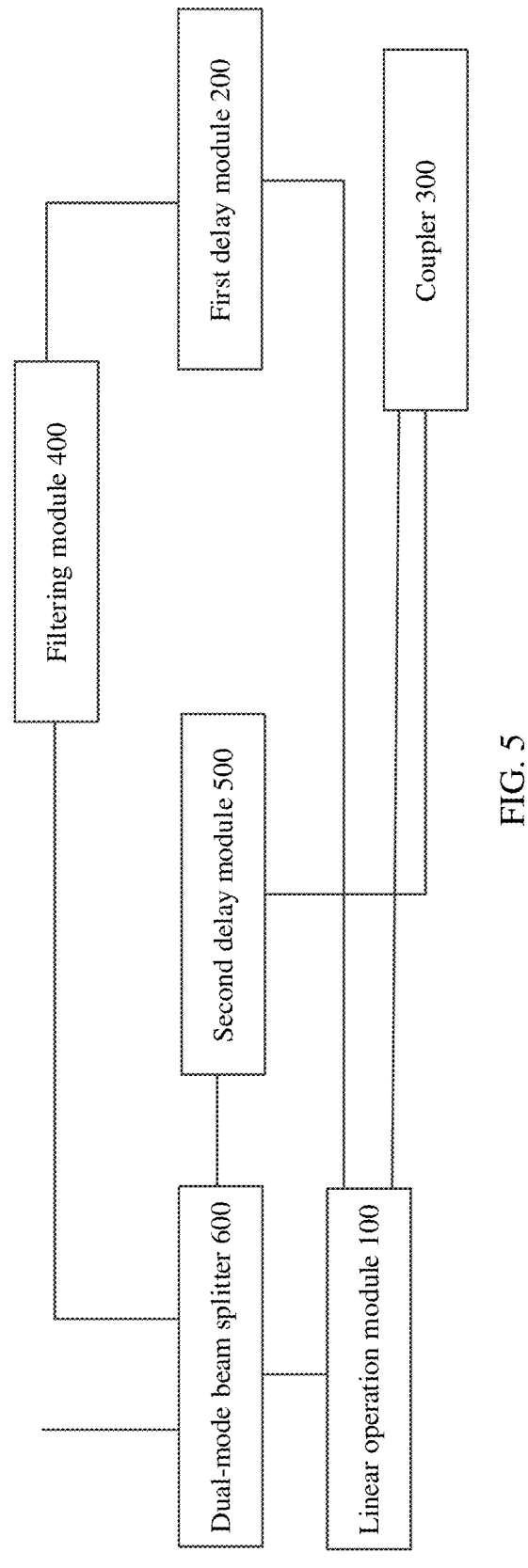
FIG. 5 is a schematic diagram of a structure of an optical computing apparatus according to this application.

In a possible implementation, as shown in FIG. 5, the optical computing apparatus may further include a dual-mode beam splitter 600. The dual-mode beam splitter 600 may receive the first group of optical signals and the third group of optical signals, and transmit the first group of optical signals and the third group of optical signals to the linear operation module 100. The dual-mode beam splitter 600 may further receive the second group of optical signals and transmit the second group of optical signals to the second delay module 500 or the first delay module 200.

It should be noted that in addition to transmitting one group of optical signals to the linear operation module 100, the second delay module 500, or the first delay module 200, the dual-mode beam splitter 600 may split one group of optical signals into two groups of optical signals that are the same as the pre-split group of optical signals. For example, the dual-mode beam splitter 600 may first receive a twelfth group of optical signals, and split the twelfth group of optical signals into the first group of optical signals and the third group of optical signals.

Figure 6A:
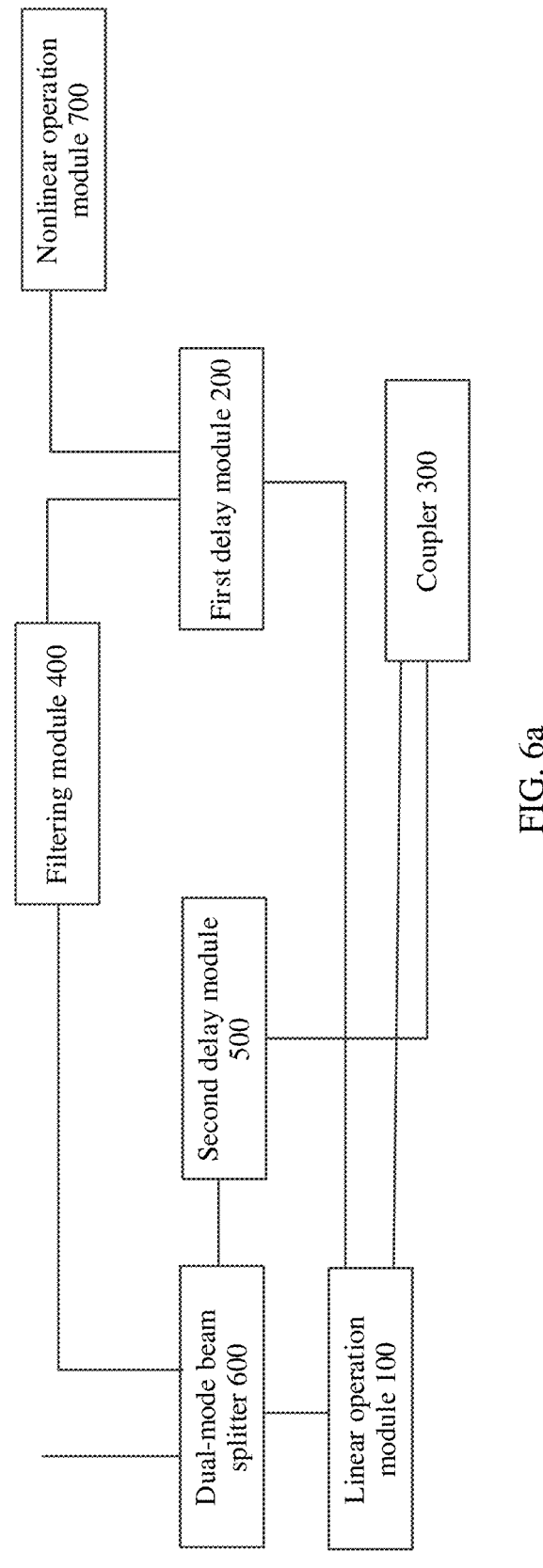
FIG. 6a is a schematic diagram of a structure of an optical computing apparatus according to this application.

In a possible implementation, as shown in FIG. 6*a*, the optical computing apparatus may further be provided with a nonlinear operation module 700. The nonlinear operation module 700 may perform a nonlinear operation on the second group of optical signals. The nonlinear operation is to implement a function of an activation function configured in a neural network model.

It should be noted that a position at which the nonlinear operation module 700 is disposed is not limited in this embodiment. For example, the nonlinear operation module 700 may be connected to the coupler 300, to facilitate receiving of the fifth group of optical signals, the sixth group of optical signals, the eighth group of optical signals, and the eleventh group of optical signals from the coupler 300. Alternatively, the nonlinear operation module 700 may be connected to the first delay module 200, as shown in FIG. 6*a*. In this way, the nonlinear operation module 700 may receive the fifth group of optical signals, the sixth group of optical signals, the eighth group of optical signals, and the eleventh group of optical signals through the first delay module 200.

Figure 6B:
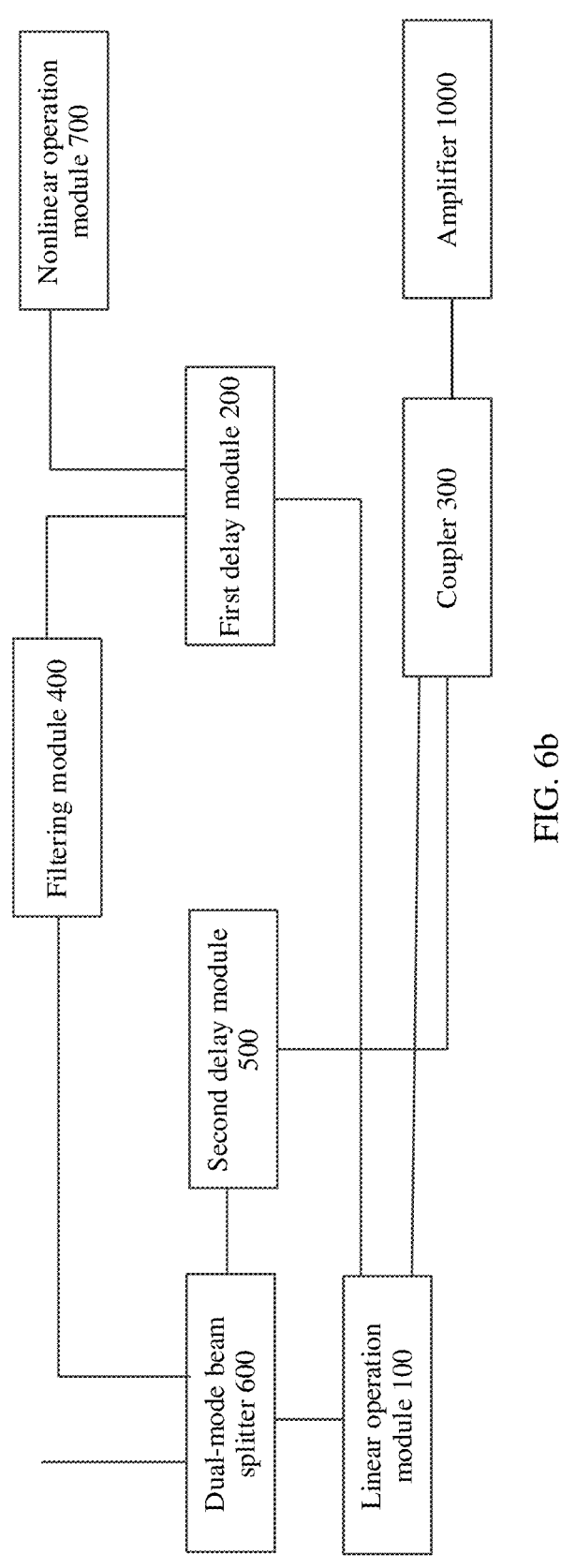
FIG. 6b is a schematic diagram of a structure of an optical computing apparatus according to this application.

In a possible implementation, as shown in FIG. 6*b*, the optical computing apparatus may further include an optical amplifier 1000. The optical amplifier may be connected to the coupler 300 (as shown in FIG. 6*b*) or the nonlinear operation module 700, to amplify powers of the fifth group of optical signals, the sixth group of optical signals, the eighth group of optical signals, and the eleventh group of optical signals. The amplifier 1000 may be a semiconductor optical amplifier (SOA) or an erbium doped fiber amplifier (EDFA).

In an actual operation process, not all operation processes require participation of the nonlinear operation module 700. To improve versatility of the optical computing apparatus to make the optical computing apparatus be applicable to various operation scenarios, the optical computing apparatus may include a plurality of optical switches, configured to change a transmission direction of an optical signal in the optical computing apparatus. Optionally, the optical computing apparatus may further include a plurality of couplers, configured to combine optical signals output by different modules or devices.

Figure 7:
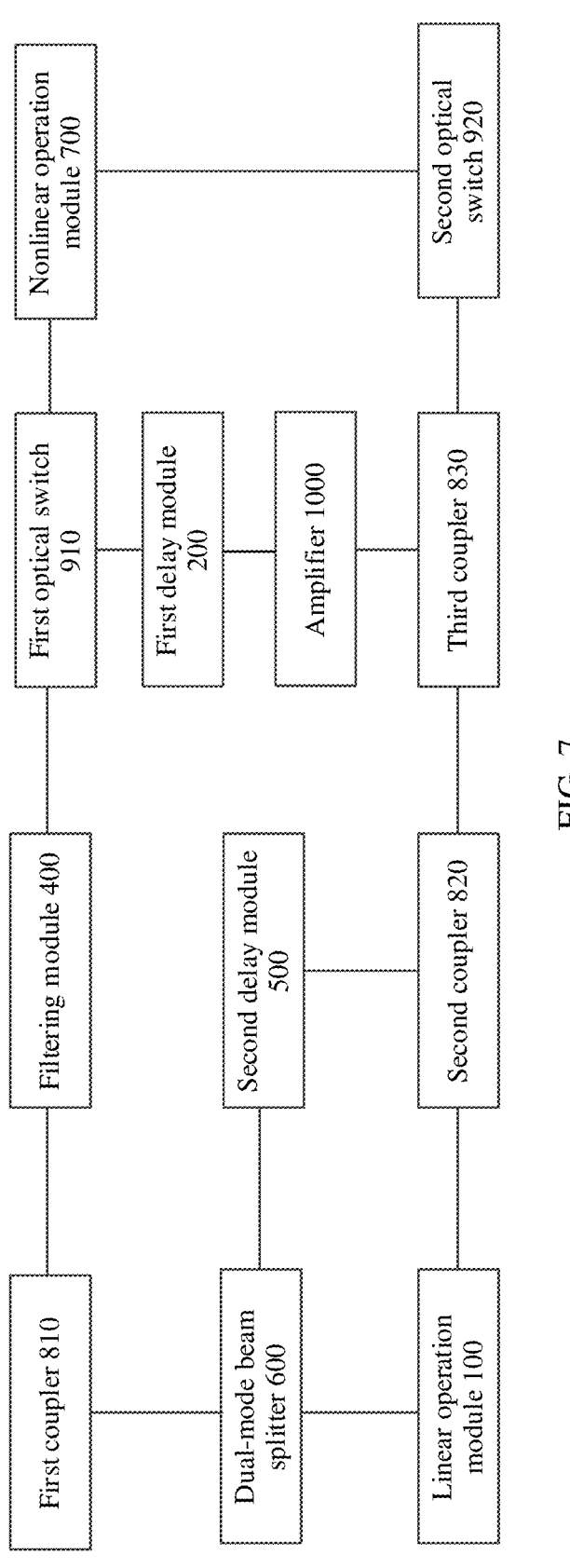
FIG. 7 is a schematic diagram of a structure of an optical computing apparatus according to this application.

FIG. 7 shows an optical computing apparatus according to an embodiment of this application. The optical computing apparatus includes a dual-mode beam splitter 600, a linear operation module 100, a second delay module 500, a first delay module 200, a nonlinear operation module 700, and a filtering module 400. The optical computing apparatus further includes three couplers: a first coupler 810, a second coupler 820, and a third coupler 830. The optical computing apparatus further includes two optical switches: a first optical switch 910 and a second optical switch 920. The optical computing apparatus further includes an amplifier 1000, which is connected to the third coupler 830 or the first optical switch 910. It should be noted that a position at which the amplifier 1000 is disposed is not limited in this embodiment. The amplifier 1000 may be disposed at any position on a path of the second coupler 820->the third coupler 830->the first optical switch 910->the first coupler 810.

For functions of the dual-mode beam splitter 600, the linear operation module 100, the second delay module 500, the first delay module 200, the nonlinear operation module 700, and the filtering module 400, refer to the foregoing description. Details are not described herein again.

A coupler is mainly configured to combine optical signals output by different modules or devices. For example, the first coupler 810 can couple an optical signal (for example, a third group of optical signals) input to the optical computing apparatus and an optical signal (for example, a second group of optical signals, an eighth group of optical signals, or an eleventh group of optical signals) output by the filtering module 400. The second coupler 820 is configured to combine an optical signal (for example, a fourth group of optical signals) output by the linear operation module 100 and an optical signal (for example, the delay-adjusted second group of optical signals) output by the second delay module 500. The third coupler 830 may combine an optical signal output by the second coupler 820 and an optical signal output by the nonlinear operation module 700.

An optical switch may change a transmission direction of an optical signal. For example, the first optical switch 910 can transmit, to the filtering module 400 or the nonlinear operation module 700, a signal output by the first delay module 200. The second optical switch 920 can transmit, to the third coupler 830, an optical signal output by the nonlinear operation module 700, or output an optical signal output by the nonlinear operation module 700.

The following describes, with reference to FIG. 7, a transmission process of an optical signal in the optical computing apparatus in a process in which the optical computing apparatus implements an operation. The optical computing apparatus may implement two operation processes, one being an operation process of a linear operation and the other being an operation process of a nonlinear operation. The following separately describes a transmission process of an optical signal in the two operation processes.

1. Operation Process of a Linear Operation

Figure 8A:
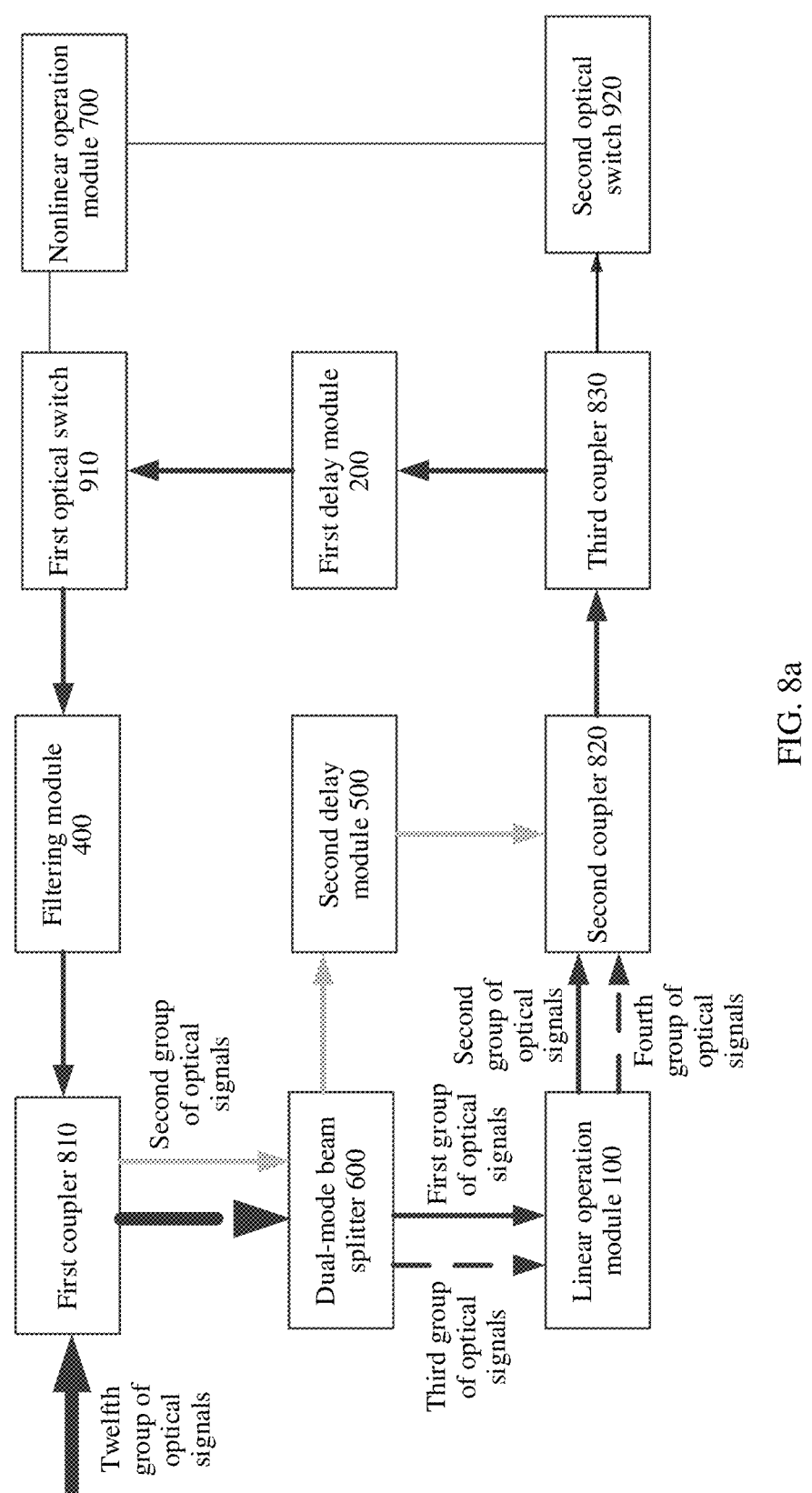
FIG. 8a is a schematic diagram of a transmission path of an optical signal according to this application.

An example is used in which the linear operation module 100 performs a linear operation on a first group of optical signals and a third group of optical signals. In FIG. 8a, a black solid line is used to mark a transmission path on which the first group of optical signals becomes a second group of optical signals after passing through the linear operation module 100. The following can be learned from FIG. 8a: A twelfth group of optical signals enters the optical computing apparatus through the first coupler 810 and then passes through the dual-mode beam splitter 600. The dual-mode beam splitter 600 splits the twelfth group of optical signals into the first group of optical signals and the third group of optical signals, and transmits the first group of optical signals to the linear operation module 100. The linear operation module 100 modulates the first group of optical signals based on received first electrical signals and outputs the second group of optical signals. The second group of optical signals is transmitted to the third coupler 830 through the second coupler 820. The third coupler 830 transmits the second group of optical signals to the first delay module 200. The first delay module 200 adjusts a delay of the second group of optical signals. The delay-adjusted second group of optical signals is transmitted to the filtering module 400 under action of the first optical switch 910. The filtering module 400 may not perform any removal operation, and directly transmits the delay-adjusted second group of optical signals to the first coupler 810.

The third group of optical signals is transmitted in the optical computing apparatus without passing through the linear operation module 100. A transmission path is as follows: the second delay module 500->the second coupler 820->the third coupler 830->the first delay module 200->the first optical switch 910->the filtering module 400->the first coupler 810->the dual-mode beam splitter 600. After a last optical signal in the first group of optical signals is input to the linear operation module 100, the dual-mode beam splitter 600 transmits the third group of optical signals to the linear operation module 100.

In FIG. 8a, a black dashed line is used to mark a transmission path on which the third group of optical signals becomes a fourth group of optical signals after passing through the linear operation module 100. The following can be learned from FIG. 8a: The dual-mode beam splitter 600 transmits the third group of optical signals to the linear operation module 100. The third group of optical signals is input to the linear operation module 100. The linear operation module 100 modulates the third group of optical signals based on received second electrical signals and outputs the fourth group of optical signals.

In FIG. 8a, a gray solid line is used to mark a transmission path on which the second group of optical signals is transmitted after passing through the first coupler 810. The second group of optical signals passes through the dual-mode beam splitter 600, the dual-mode beam splitter 600 transmits the second group of optical signals to the second delay module 500, and the second delay module 500 further adjusts a delay of the second group of optical signals, so that the second group of optical signals can arrive at the second coupler 820 simultaneously with the fourth group of optical signals after being output from the second delay module 500.

The second coupler 820 couples the second group of optical signals and the fourth group of optical signals, outputs a fifth group of optical signals, and transmits the fifth group of optical signals to the third coupler 830.

If the optical computing device subsequently does not need to continue to receive optical signals indicating first group of data, that is, computation performed by the optical computing apparatus are all completed, the fifth group of optical signals output by the third coupler 830 may pass through the first delay module 200 (the first delay module 200 does not perform an operation), the first optical switch 910, the nonlinear operation module 700 (the nonlinear operation module 700 does not perform an operation), and the second optical switch 920, and may be output from the optical computing apparatus. The fifth group of optical signals may indicate a final computing result.

If the optical computing device subsequently further needs to continue to receive optical signals indicating the first group of data, the third coupler 830 may continue to transmit the fifth group of optical signals to the first delay module 200. A transmission process of the fifth group of optical signals is similar to a process in which the second group of optical signals is transmitted after being output from the third coupler 830. For details, refer to the foregoing content. Details are not described herein again. The third coupler 830 may combine the delayed fifth group of optical signals and another group of optical signals modulated by the linear operation module 100, and output a sixth group of optical signals. The sixth group of optical signals output by the third coupler 830 may pass through the first delay module 200 (the first delay module 200 does not perform an operation), the first optical switch 910, the nonlinear operation module 700 (the nonlinear operation module 700 does not perform an operation), and the second optical switch

920, and may be output from the optical computing apparatus. The sixth group of optical signals may indicate a final computing result.

Transmission processes of the optical signals shown in FIG. 8*a* relate to only linear operation processes. When the optical computing apparatus needs to implement a pooling operation, the optical signals on which linear operations are performed and that are obtained after the third coupler 830 performs coupling further need to continue to be transmitted in the optical computing apparatus for further processing.

A transmission process of an optical signal in the optical computing apparatus shown in FIG. 7 during a pooling operation performed by the optical computing apparatus is described by using an example in which a pooling operation needs to be performed on the sixth group of optical signals. The sixth group of optical signals output by the third coupler 830 may pass through the first delay module 200 (the first delay module 200 does not perform an operation), the first optical switch 910, the filtering module 400 (the filtering module 400 does not perform an operation), the first coupler 810, and the dual-mode beam splitter 600, and finally arrive at the linear operation module 100. The linear operation module 100 modulates the sixth group of optical signals based on received third electrical signals indicating second weights, and outputs a seventh group of optical signals. The seventh group of optical signals passes through the second coupler 820, the third coupler 830, the first delay module 200 (the first delay module 200 does not perform an operation), and the first optical switch 910, and arrives at the filtering module 400. The filtering module 400 filters out an invalid signal from the seventh group of optical signals and outputs an eighth group of optical signals. The eighth group of optical signals passes through the second coupler 820, the third coupler 830, the first delay module 200, the first optical switch 910, the nonlinear operation module 700 (the nonlinear operation module 700 does not perform an operation), and the second optical switch 920, and is output from the optical computing apparatus.

A transmission process of an optical signal in the optical computing apparatus shown in FIG. 7 during a convolution operation performed by the optical computing apparatus is described by using an example in which a convolution operation needs to be performed on a ninth group of optical signals. The linear operation module 100 receives the ninth group of optical signals. The linear operation module 100 modulates the ninth group of optical signals based on received fourth electrical signals and outputs a tenth group of optical signals (Herein, as merely an example, the linear operation module 100 outputs the tenth group of optical signals by performing only one modulation, where the tenth group of optical signals indicates a result that is obtained after a multiply-add operation is performed on a second group of data and third weights. In an actual operation, generation of the tenth group of optical signals may alternatively be similar to a process of generating the fifth group of optical signals or the sixth group of optical signals. To be specific, modules such as the linear operation module 100, the first delay module 200, the second delay module 500, the second coupler 820, and the third coupler 830 may cooperate to generate the tenth group of optical signals). The tenth group of optical signals is transmitted to the third coupler 830 through the second coupler 820. The tenth group of optical signals passes through the third coupler 830, the first delay module 200 (the first delay module 200 does not perform an operation), and the first optical switch 910, and arrives at the filtering module 400. The filtering module 400 filters out an invalid signal from the tenth group of optical signals and outputs an eleventh group of optical signals. The eleventh group of optical signals passes through the second coupler 820, the third coupler 830, the first delay module 200, the first optical switch 910, the nonlinear operation module 700 (the nonlinear operation module 700 does not perform an operation), and the second optical switch 920, and is output from the optical computing apparatus.

2. Operation Process of a Nonlinear Operation

Description is provided by still using an example in which the optical computing apparatus performs a nonlinear operation on a fifth group of optical signals.

Figure 8B:
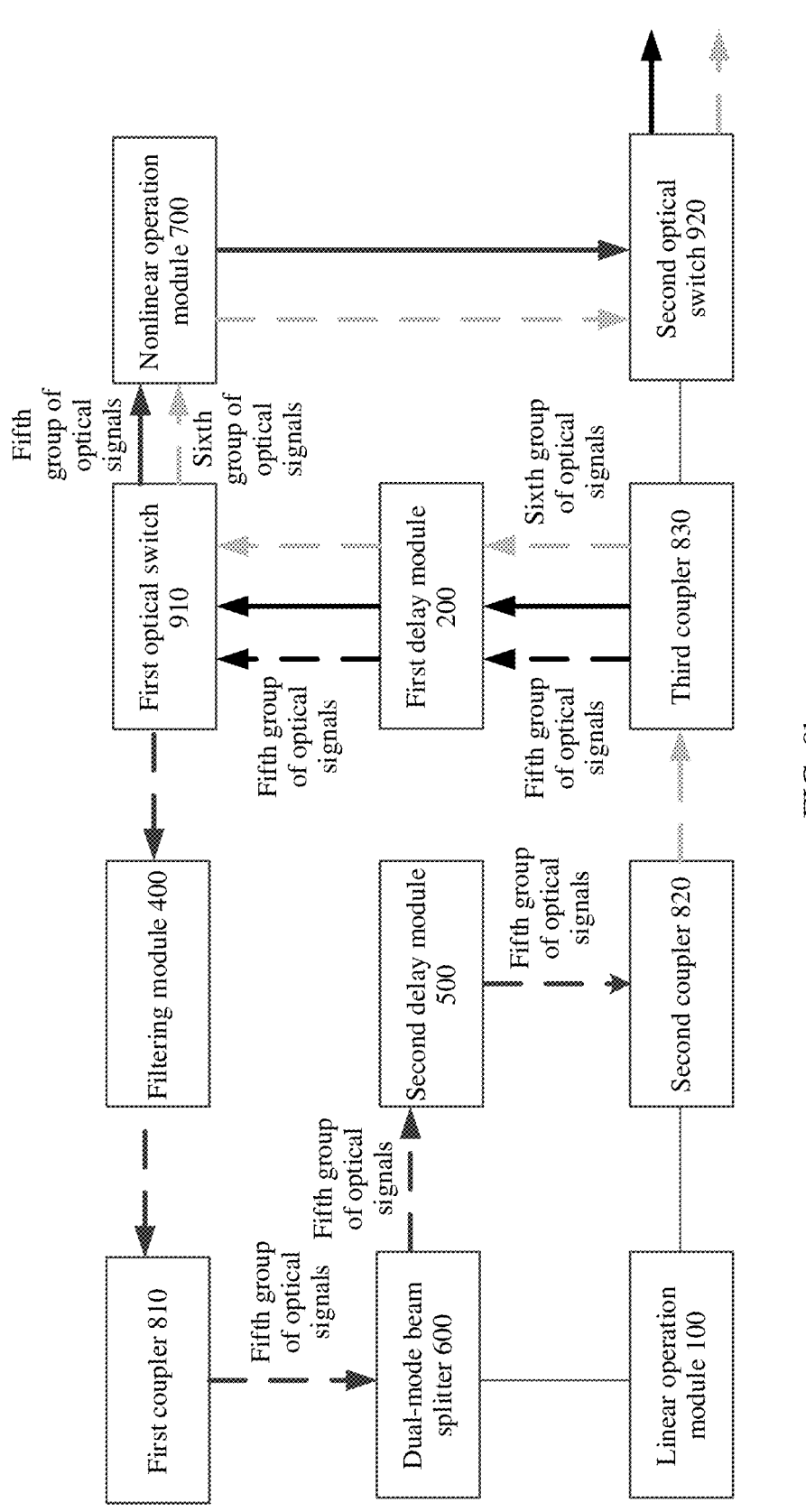
FIG. 8b is a schematic diagram of a transmission path of an optical signal according to this application.

In FIG. 8*b*, a black solid line is used to mark a transmission path of the fifth group of optical signals. If the optical computing device subsequently does not need to continue to receive optical signals indicating first group of data, that is, linear operations that the optical computing apparatus needs to perform are all completed, the third coupler 830 transmits the fifth group of optical signals to the first delay module 200. The first delay module 200 may not process the fifth group of optical signals, but transmits the fifth group of optical signals to the first optical switch 910. Through the first optical switch 910, the fifth group of optical signals may be transmitted to the nonlinear operation module 700. The nonlinear operation module 700 may perform a nonlinear operation on the fifth group of optical signals, and then transmit the fifth group of optical signals on which the nonlinear operation is performed to the second optical switch 920. Through the second optical switch 920, the fifth group of optical signals on which the nonlinear operation is performed is output from the optical computing apparatus. The fifth group of optical signals on which the nonlinear operation is performed may indicate a final computing result.

In FIG. 8*b*, a black dashed line is used to mark another transmission path of the fifth group of optical signals. If the optical computing device subsequently further needs to continue to process the fifth group of optical signals, the third coupler 830 may continue to transmit the fifth group of optical signals to the first delay module 200. A transmission process of the fifth group of optical signals is similar to a process in which a second group of optical signals is transmitted after being output from the third coupler 830. For details, refer to the foregoing content. Details are not described herein again. After linear operations that the linear operation module 100 needs to perform are all completed, that is, after all the linear operations are completed, the third coupler 830 may receive combined optical signals from the second coupler 820. Herein, an example is used in which after the linear operation module 100 performs all the linear operations, optical signals that the third coupler 830 receives from the second coupler 820 are a sixth group of optical signals. In FIG. 8*b*, a gray dashed line is used to mark a transmission path of the sixth group of optical signals. The third coupler 830 transmits the received sixth group of optical signals to the first delay module 200. The first delay module 200 may not process the sixth group of optical signals, but transmits the sixth group of optical signals to the first optical switch 910. Through the first optical switch 910, the sixth group of optical signals may be transmitted to the nonlinear operation module 700. The nonlinear operation module 700 may perform a nonlinear operation on the sixth group of optical signals, and then transmit the sixth group of optical signals on which the nonlinear operation is performed to the second optical switch 920. Through the second optical switch 920, the sixth group of optical signals on which the nonlinear operation is performed is output from the optical computing apparatus. The sixth group of optical signals on which the nonlinear operation is performed may indicate a final computing result.

It should be noted that the amplifier 1000 is not shown in FIG. 8a and FIG. 8b, and the amplifier 1000 may amplify the optical signals output by the third coupler 830.

The following describes composition of each module or device in the optical computing apparatus and a process in which each module or device processes optical signals.

(1) Linear Operation Module 100

The linear operation module 100 can modulate received optical signals (a first group of optical signals, a third group of optical signals, and a sixth group of optical signals) based on received electrical signals (first electrical signals, second electrical signals, or third electrical signals), and change light intensities of the optical signals, to implement a linear operation.

To implement the linear operation, the linear operation module 100 may classify the optical signals into N optical signals with different delays after receiving the optical signals, and then modulate the N optical signals with different delays.

The linear operation module 100 includes a plurality of beam splitters, a plurality of delay waveguides/optical waveguide delay line, a plurality of couplers, and N optoelectronic modulators. Optionally, the linear operation module 100 may further include a delay control module.

The delay control module receives optical signals input to the linear operation module, and calibrates delays of the optical signals. Functions of the delay control module, the first delay module 200, and the second delay module 500 are all to adjust delays of optical signals. Structures of the delay control module, the first delay module 200, and the second delay module 500 are also similar. For the structure of the delay control module, refer to description of the first delay module 200 and the second delay module 500 below. Details are not described herein.

The beam splitter may split one channel of optical signals into two channels of same optical signals. The beam splitter may be a Y-shaped beam splitter, or may be a multimode interference coupler. Any manner in which one channel of optical signals can be split into two channels of same optical signals is applicable to the embodiments of this application. The delay waveguide may transmit optical signals and further adjust delays of the transmitted optical signals.

The plurality of beam splitters and the plurality of delay waveguides cooperate to split the optical signals output by the delay control module into N optical signals with different delays.

The optoelectronic modulator is configured to modulate an optical signal based on a received electrical signal. The optoelectronic modulator may be an MZI or a tunable microring resonant cavity. Each optoelectronic modulator is configured to modulate one of the N different optical signals output by the plurality of beam splitters and the plurality of delay waveguides.

The plurality of couplers are configured to cooperate to combine optical signals output by the N optoelectronic modulators into one optical signal. The coupler may be a Y-shaped beam splitter. A function of the coupler is implemented by using a reverse Y-shaped beam splitter.

FIG. 9a is a schematic diagram of a structure of a linear operation module 100 in a case that N is equal to 4. The linear operation module 100 includes a delay control module 1100, three beam splitters (which are a beam splitter 1101, a beam splitter 1102, and a beam splitter 1103, respectively, for distinguishing purposes), three delay waveguides (which are a delay waveguide 1104, a delay waveguide 1105, and a delay waveguide 1106, respectively, for distinguishing purposes), four optoelectronic modulators (which are an optoelectronic modulator 1107, an optoelectronic modulator 1108, an optoelectronic modulator 1109, and an optoelectronic modulator 1110, respectively, for distinguishing purposes), and three couplers (which are a coupler 1111, a coupler 1112, and a coupler 1113, respectively, for distinguishing purposes).

That the linear operation module 100 shown in FIG. 9a receives a first group of optical signals is used as an example for description. The first group of optical signals is input to the delay control module 1100. The delay control module 1100 adjusts a delay of the first group of optical signals.

The delay-adjusted first group of optical signals is transmitted to the beam splitter 1101 and split into two channels of same first groups of optical signals. For ease of description, the two channels of first groups of optical signals are denoted as a first group of optical signals 1 and a first group of optical signals 2, respectively. The first group of optical signals 1 does not need to pass through a delay waveguide, and is transmitted to the beam splitter 1102 and split into two channels of same first groups of optical signals. For ease of description, the two channels of first groups of optical signals are denoted as a first group of optical signals 3 and a first group of optical signals 4, respectively. The first group of optical signals 3 is transmitted to the optoelectronic modulator 1107. The first group of optical signals 4 passes through the delay waveguide 1105. The delay waveguide 1105 adjusts a delay of the first group of optical signals 4. The delay-adjusted first group of optical signals 4 is transmitted to the optoelectronic modulator 1108.

The first group of optical signals 2 passes through the delay waveguide 1104, and is transmitted to the beam splitter 1103 and split into two channels of same first groups of optical signals. For ease of description, the two channels of first groups of optical signals are denoted as a first group of optical signals 5 and a first group of optical signals 6, respectively. The first group of optical signals 5 is transmitted to the optoelectronic modulator 1109. The first group of optical signals 6 passes through the delay waveguide 1106. The delay waveguide 1106 adjusts a delay of the first group of optical signals 6. The delay-adjusted second group of optical signals 6 is transmitted to the optoelectronic modulator 1110.

First electrical signals received by the linear operation module 100 may be loaded onto the four optoelectronic modulators, so that the four optoelectronic modulators can separately modulate the received first groups of optical signals based on the first electrical signals.

It should be noted herein that the first electrical signals may include a plurality of sub-signals. One sub-signal is loaded onto each optoelectronic modulator, and each optoelectronic modulator modulates the received first group of optical signals based on the loaded electrical signal.

The linear operation module 100 may further include N phase modulators. One phase modulator is connected to one optoelectronic modulator. The phase modulators can modulate phases of optical signals output by the optoelectronic modulators. The linear operation module 100 may further include at least (N−1) phase locking modules. The phase locking modules are configured to stabilize phases of optical signals.

FIG. 9b-1 and FIG. 9b-2 show a linear operation module in a case that N is equal to 4 according to an embodiment of this application. Different from the linear operation module 100 in FIG. 9a, the linear operation module 100 in FIG. 9b-1 and FIG. 9b-2 includes four phase modulators, which are a phase modulator 1114, a phase modulator 1115, a phase modulator 1116, and a phase modulator 1117, respectively, and further includes three phase locking modules, which are a phase locking unit 1118, a phase locking unit 1119, and a phase locking unit 1120, respectively.

The phase modulator 1114 is connected to the optoelectronic modulator 1107, and adjusts phases of optical signals output by the optoelectronic modulator 1107. The phase modulator 1115 is connected to the optoelectronic modulator 1108, and adjusts phases of optical signals output by the optoelectronic modulator 1108. The phase modulator 1116 is connected to the optoelectronic modulator 1109, and adjusts phases of optical signals output by the optoelectronic modulator 1109. The phase modulator 1117 is connected to the optoelectronic modulator 1110, and adjusts phases of optical signals output by the optoelectronic modulator 1110.

The phase locking unit 1118 is connected to the phase modulator 1114, and locks, based on optical signals output by the coupler 1111, phases of optical signals output by the phase modulator 1114. The phase locking unit 1119 is connected to the phase modulator 1116, and locks, based on optical signals output by the coupler 1112, phases of optical signals output by the phase modulator 1116. The phase locking unit 1120 is connected to the coupler 1112, and locks, based on optical signals output by the coupler 1113, phases of optical signals output by the coupler 1112.

(2) First Delay Module 200 and Second Delay Module 500

In the optical computing apparatus, functions of the first delay module 200 and the second delay module 500 are both to adjust delays of optical signals. Structures of the first delay module 200 and the second delay module 500 are not limited in the embodiments of this application. Any device capable of adjusting delays of optical signals is applicable to the embodiments of this application.

Figure 10:
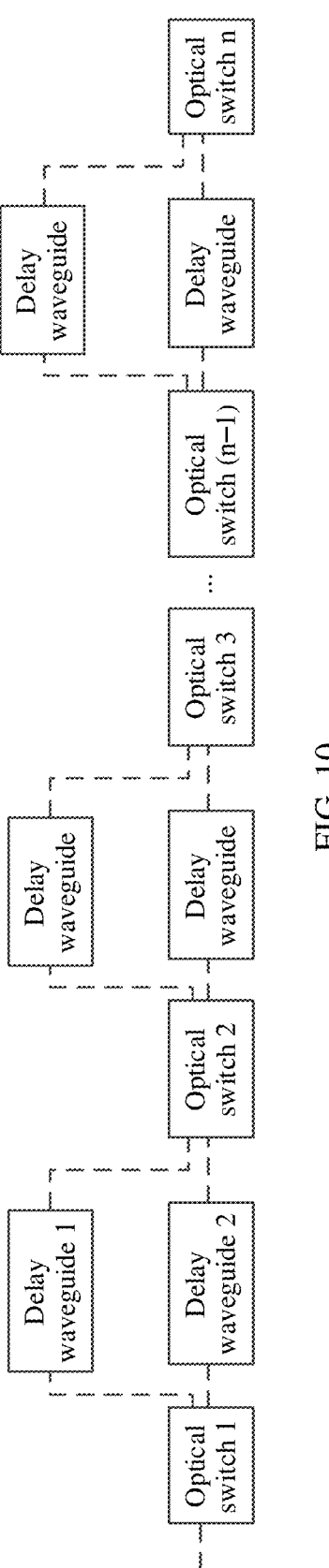
FIG. 10 is a schematic diagram of a structure of a first delay module according to this application.

The following describes a structure of a first delay module 200 according to an embodiment of this application. Referring to FIG. 10, the first delay module 200 may use a cascaded structure. The first delay module 200 may include a plurality of optical switches connected in series (which are an optical switch 1, an optical switch 2, . . . , and an optical switch n, respectively, in FIG. 10 for distinguishing purposes). Two transmission paths of optical signals are disposed between two optical switches. One is a long-delay transmission path, on which a device capable of adjusting a delay (for example, a delay waveguide 1) is disposed, and the device can add a relatively long delay to an optical signal. The other is a short-delay transmission path, on which a device capable of adjusting a delay (for example, a delay waveguide 2) may be disposed, and the device can add a relatively short delay to an optical signal. The delay that the device adds to an optical signal is shorter than the delay that the device capable of adjusting a delay disposed on the long-delay transmission path adds to an optical signal. Alternatively, as a possible implementation, a device capable of adjusting a delay may not be disposed on the short-delay transmission path. In the first delay module 200, each optical switch may be controlled by an electrical signal, and is configured to select a transmission path of optical signals.

(3) Filtering Module 400

The filtering module 400 can remove an optical signal from serial optical signals, and can also adjust a delay of an optical signal that is transmitted before the removed optical signal, to ensure that the filtering module 400 outputs a group of optical signals without a vacancy.

Figure 11:
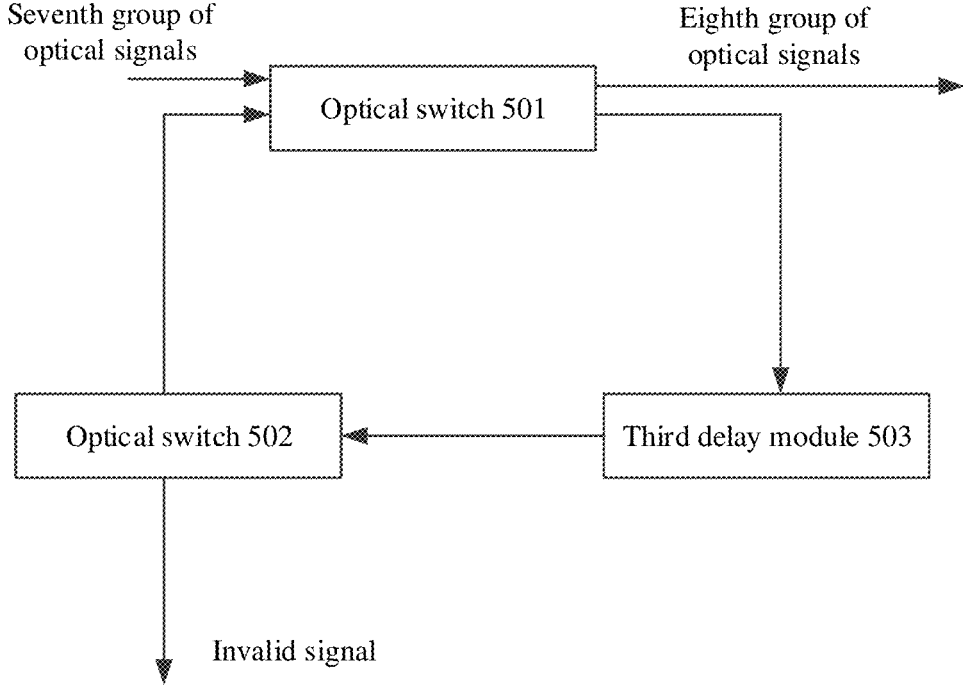
FIG. 11 is a schematic diagram of a structure of a filtering module according to this application.

FIG. 11 is a schematic diagram of a structure of a filtering module according to an embodiment of this application. The filtering module 400 includes two optical switches (which are an optical switch 501 and an optical switch 502, for distinguishing purposes and ease of description) and a third delay module 503.

By using an example in which optical signals received by the filtering module 400 are a seventh group of optical signals, the following describes a transmission process of optical signals in the filtering module 400.

After being input to the filtering module 400, the seventh group of optical signals first enters the optical switch 501. Under action of the optical switch 501, the seventh group of optical signals is transmitted to the third delay module 503. The third delay module 503 may directly transmit the seventh group of optical signals to the optical switch 502 without performing processing. The optical switch 502 outputs an invalid signal in the seventh group of optical signals out of the optical computing apparatus, and transmits optical signals (an eighth group of optical signals) remaining in the seventh group of optical signals to the optical switch 501. The optical switch 501 transmits the eighth group of optical signals to the third delay module 503. Because the signals included in the seventh group of optical signals are serial optical signals, there is a vacancy in the eighth group of optical signals after an optical signal in the seventh group of optical signals is removed. To eliminate the vacancy, the third delay module 503 may adjust a delay of an optical signal whose transmission time is earlier than the invalid signal and that is in the eighth group of optical signals, without adjusting a delay of an optical signal whose transmission time is later than the invalid signal, to ensure that there is no longer a vacancy between the optical signal whose transmission time is earlier than the invalid signal and the optical signal whose transmission time is later than the invalid signal.

(4) Dual-Mode Beam Splitter 600 and Optical Switches (the First Optical Switch 910 and the Second Optical Switch 920)

The dual-mode beam splitter 600 and the optical switches are essentially beam splitters with a function of adjusting a split ratio.

Figure 12:
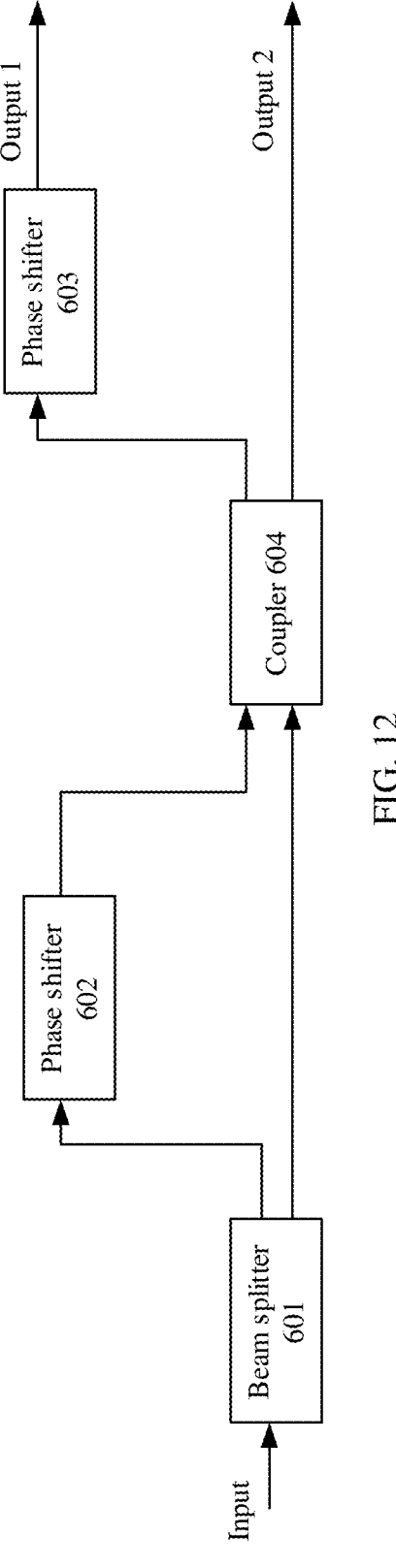
FIG. 12 is a schematic diagram of a structure of a dual-mode beam splitter according to this application.

Structures of the dual-mode beam splitter 600 and the optical switches are described by using the dual-mode beam splitter 600 as an example. As shown in FIG. 12, the dual-mode beam splitter 600 includes a beam splitter 601, two phase shifters (which are a phase shifter 602 and a phase shifter 603, respectively, for distinguishing purposes and ease of description), and a coupler 604. The beam splitter 601 may split optical signals into two channels of same optical signals. The phase shifter 602 and the phase shifter 603 may compensate for phases of optical signals, to adjust a split ratio.

(5) Couplers (for Example, the Coupler 300, the First Coupler 810, the Second Coupler 820, and the Coupler 604)

The couplers in the embodiments of this application may be Y-shaped couplers, and each are configured to couple two channels of optical signals into one channel of optical signals.

(6) Nonlinear Operation Module 700

Composition of the nonlinear operation module 700 is not limited in the embodiments of this application. For example, the nonlinear operation module 700 may include a device with an optical nonlinear effect, for example, a graphene layer.

With reference to the optical computing apparatus shown in FIG. 7, manners in which the optical computing apparatus implements operation processes at a fully connected layer, a convolutional layer, and a pooling layer are described.

1. Fully Connected Layer

To implement an operation at the fully connected layer, the optical computing apparatus may be used to implement a multiply-add operation. The optical computing apparatus may receive serial optical signals (for example, a first group of optical signals or a third group of optical signals) for a plurality of times. For ease of description, $X_c$ [1] to $X_c$ [n] are used herein to represent serial optical signals. The serial optical signals are constituted by n sub-signals (for example, Xc [1] and Xc [n]).

After entering the optical computing apparatus, the serial optical signals $X_c$ [1] to $X_c$ [n] are successively transmitted to the linear operation module 100. In the linear operation module 100, for any sub-signal, the linear operation module 100 may modulate the sub-signal based on received electrical signals (for example, first electrical signals and second electrical signals). The modulated sub-signals continue to be transmitted in the optical computing apparatus. Specifically, the modulated sub-signals pass through the first delay module 200 (which adjusts delays of the modulated sub-signals, so that the adjusted sub-signals can be aligned, in terms of delays, with modulated sub-signals that are in the serial optical signals Xc [1]~Xc [n] input to the optical computing apparatus next time), the filtering module 400 (the filtering module 400 does not perform any processing), the dual-mode beam splitter 600, the second delay module 500, the second coupler 820, and the third coupler 830.

The optical computing apparatus may continue to receive the serial optical signals Xc [1] to Xc [n] to perform the foregoing operations until all linear operations are completed.

By using an example in which n is equal to 8 and the linear operation module 100 includes four modulators, the following describes an operation process performed by the optical computing apparatus.

Referring to FIG. 13, the linear operation module 100 successively receives Xc [1] to Xc [8] in time segments 1 to 8. The four modulators in the linear operation module 100 may adjust intensities of Xc [1] to Xc [8]. $w_{ij}$ may indicate a degree to which the modulator in the linear operation module 100 modulates a light intensity of a sub-signal (in other words, $w_{ij}$ may indicate a weight), where i indicates a number of the sub-signal modulated by the modulator, and j indicates a number of the optoelectronic modulator.

Xc [1] is used as an example. After being input to the linear operation module 100 in the time segment 1, Xc [1] is split into four sub-signals Xc [1] with different delays, which are Xc [1] with a delay in the time segment 1, Xc [1] with a delay in the time segment 2, Xc [1] with a delay in the time segment 3, and Xc [1] with a delay in the time segment 4, respectively. A sub-signal obtained after a first optoelectronic modulator modulates Xc [1] with a delay in the time segment 1 is $w_{11}$ Xc [1]. A sub-signal obtained after a second optoelectronic modulator modulates Xc [1] with a delay in the time segment 2 is $w_{12}$ Xc [1]. A sub-signal obtained after a third optoelectronic modulator modulates Xc [1] with a delay in the time segment 3 is $w_{13}$ Xc [1]. A sub-signal obtained after a fourth optoelectronic modulator modulates Xc [1] with a delay in the time segment 4 is $w_{14}$ Xc [1].

The modulated sub-signals continue to be transmitted in the optical computing apparatus until a last sub-signal in the serial optical signals passes through the linear operation module 100. A transmission path is as follows: the second coupler 820->the third coupler 830->the first delay module 200->the filtering module 400->the dual-mode beam splitter 600->the second delay module 500.

Then, the first delay module 200 adjusts delays of all the modulated sub-signals. An added delay is 2*4θ (θ is a time length of a single signal pulse). In this case, the optical computing apparatus continues to receive the serial optical signals Xc [1] to Xc [8]. An operation process of the subsequently received serial optical signals Xc [1] to Xc [8] in the optical computing apparatus is similar to that of the previously received serial optical signals Xc [1] to Xc [8].

After passing through the linear operation module 100, the last sub-signal in the serial optical signals passes through the second coupler 820 and the third coupler 830. Then, the optical signals are combined into eight serial optical signals, which may indicate a final computing result.

2. Convolutional Layer

A computing process at the convolutional layer is similar to that at the fully connected layer. A difference lies in that when an operation at the convolutional layer is performed, the filtering module 400 may remove, from optical signals modulated by the linear operation module 100, some optical signals that do not need to participate in the operation. It should be noted that the optical signals removed by the filtering module 400 are related to the operation that needs to be completed.

An example is used in which an operation that needs to be completed at the convolutional layer is a convolution operation of a 3×3 matrix and a 2×2 convolution kernel. The convolution operation of a 3×3 matrix and a 2×2 convolution kernel is shown in FIG. 14, where $X_{c1}$ to $X_{c9}$ are to-be-input serial optical signals, and a, b, c, and d are weights indicated by the convolution kernel. Xn [1] to Xn [4] are optical signals that need to be output, indicating a final computing result.

By using an example in which n is equal to 9 and two modulators in the linear operation module 100 participate in an operation, the following describes a convolution operation performed by the optical computing apparatus.

Referring to FIG. 15a to FIG. 15d, the linear operation module 100 successively receives $X_{c1}$ to $X_{c9}$. Two modulators in the linear operation module 100 may adjust intensities of Xc [1] to Xc [9]. d and c respectively indicate degrees (that is, weights indicated by the convolution kernel) to which the modulators modulate light intensities of sub-signals in a first linear operation process of the linear operation module 100. a and b respectively indicate degrees (that is, weights indicated by the convolution kernel) to which the modulators modulate light intensities of sub-signals in a second linear operation process of the linear operation module 100. $Xn_1$ to $Xn_9$ are optical signals output by the linear operation module 100 in the first linear operation process.

Figures 15D, 16:
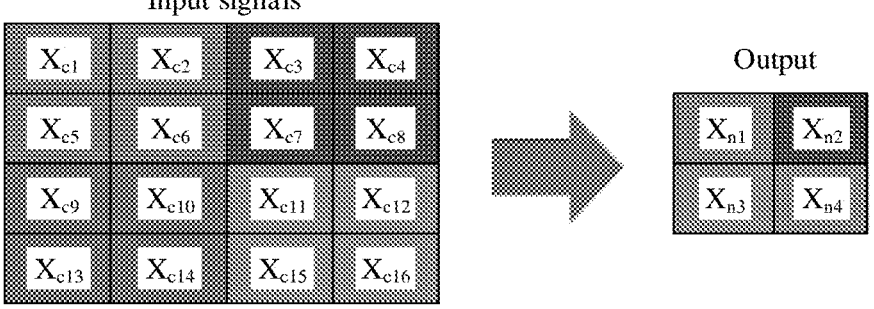
FIG. 15d is a schematic diagram of optical signals output by an optical computing apparatus according to this application.
FIG. 16 is a schematic diagram of a pooling operation according to this application.

FIG. 15a shows the input serial optical signals and output optical signals in the first linear operation process of the linear operation module 100. FIG. 15b shows the input serial optical signals and output optical signals in the second linear operation process of the linear operation module 100. FIG. 15c shows optical signals (optical signals in linear boxes are removed signals $Xn_1$ to $Xn_4$ and $Xn_7$) that the filtering module 400 removes from optical signals output by the linear operation module 100, and remaining optical signals. FIG. 15d shows optical signals finally output by the optical computing apparatus.

3. Pooling Layer

An operation process at the pooling layer is similar to that at the convolutional layer. A difference lies in that a function of a convolution kernel at the pooling layer is to retain a maximum value of specific data (maximum pooling) or an average value of specific data (average pooling).

By using an example in which the optical computing apparatus implements a process of an average pooling operation from a 4×4 matrix to a 2×2 matrix, the following describes the operation process performed by the optical computing apparatus.

The average pooling operation from a 4×4 matrix to a 2×2 matrix is shown in FIG. 16. After the average pooling operation is performed, data dimension reduction can be implemented.

Figure 17:
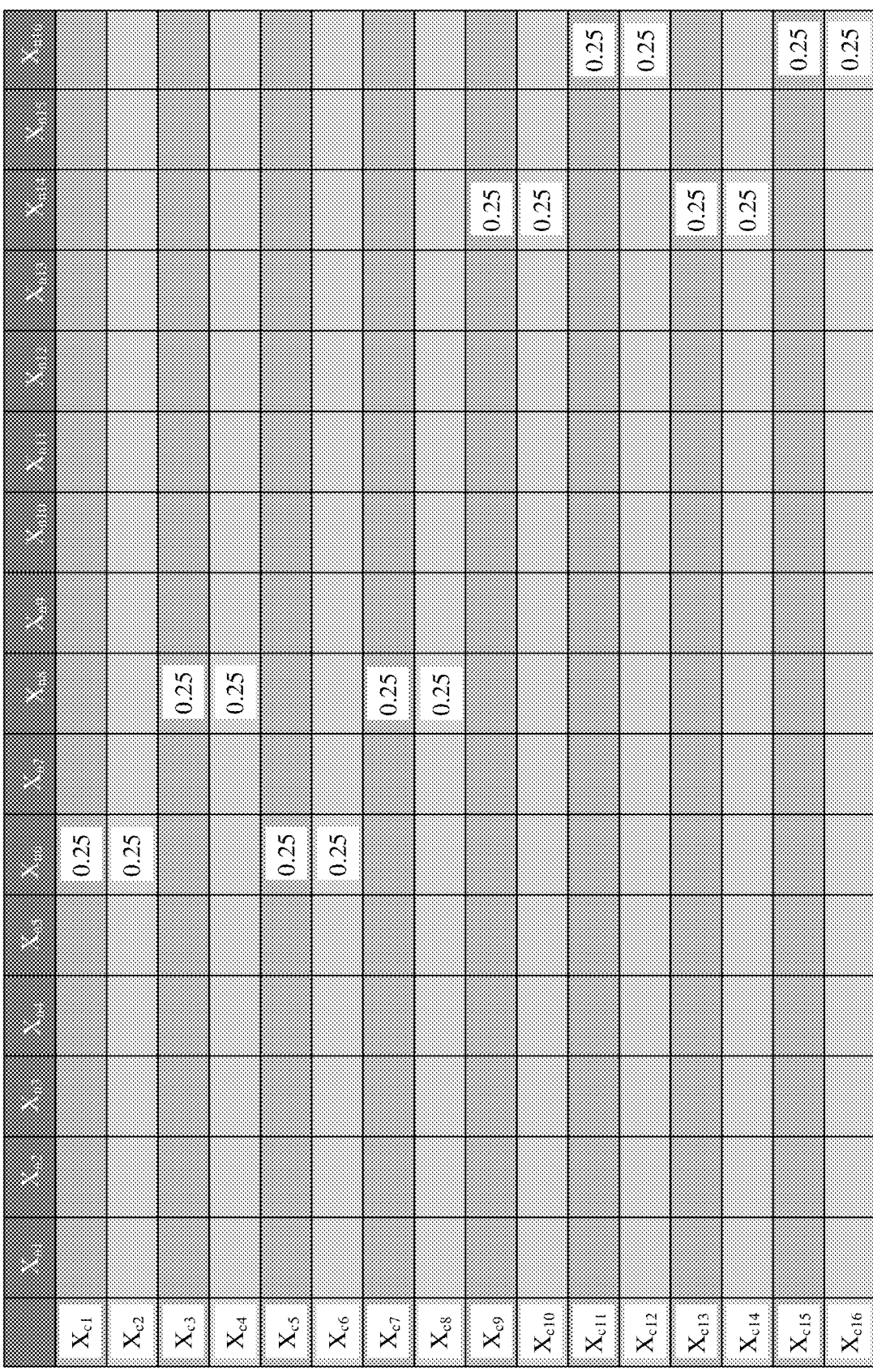
FIG. 17 is a schematic diagram of input serial optical signals and output optical signals in a linear operation process according to this application.

FIG. 17 shows input serial optical signals and output optical signals in a process in which the linear operation module 100 performs a linear operation. The linear operation module 100 successively receives $X_{c1}$ to $X_{c16}$. 0.25 indicates a degree to which a modulator modulates a light intensity of a sub-signal in the process in which the linear operation module 100 performs a linear operation. A blank indicates that a modulator modulates a light intensity of a sub-signal to 0 in a linear operation process. $Xn_1$ to $Xn_{16}$ are optical signals output by the linear operation module 100. It can be learned from FIG. 17 that valid signals are Xn6, Xn8, Xn14, and Xn16, and Xn1 to Xn5, Xn7, Xn9 to Xn13, and Xn15 are all invalid signals. The filtering module 400 in the optical computing apparatus may filter out the invalid signals.

Figure 18:
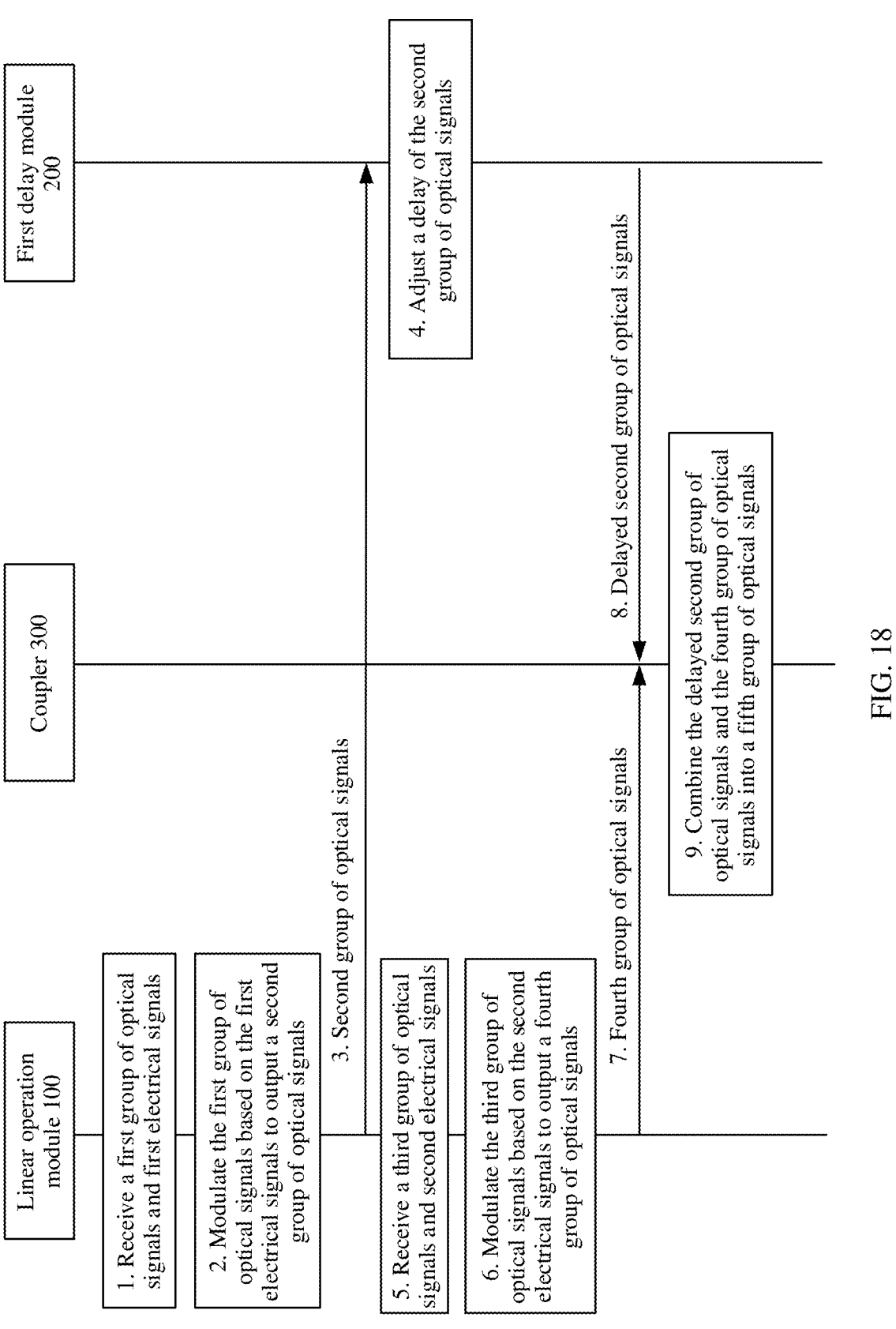
FIG. 18 shows a computing method according to this application.

To more clearly describe the solutions, the following briefly describes, with reference to the foregoing embodiments and by using a computing method shown in FIG. 18 as an example, an optical computing method performed by the optical computing apparatus provided in the embodiments of the present invention.

A linear operation module 100 receives a first group of optical signals and first electrical signals. The linear operation module 100 modulates the first group of optical signals based on the first electrical signals to output a second group of optical signals. The second group of optical signals is used to indicate a computing result of a first group of data and a first part of weights.

The linear operation module 100 may receive a third group of optical signals and second electrical signals. The linear operation module 100 modulates the third group of optical signals based on the second electrical signals to output a fourth group of optical signals. The fourth group of optical signals is used to indicate a computing result of the first group of data and a second part of the weights.

A first delay module 200 may adjust a delay of the second group of optical signals. Then, a coupler 300 may combine the delayed second group of optical signals and the fourth group of optical signals into a fifth group of optical signals. The fifth group of optical signals indicates a first computing result that is obtained after multiply-add operations are performed on the first group of data and the first part of the weights and on the first group of data and the second part of the weights.

In a possible implementation, the optical computing apparatus may further include a filtering module. Description is provided by using an example in which the optical computing apparatus performs a pooling operation on a sixth group of optical signals. The linear operation module 100 may receive the sixth group of optical signals and third electrical signals.

The linear operation module 100 modulates the sixth group of optical signals based on the third electrical signals to output a seventh group of optical signals. The filtering module may receive the seventh group of optical signals, filter out an invalid signal from the seventh group of optical signals, and output an eighth group of optical signals.

In a possible implementation, when the optical computing apparatus includes the filtering module, the optical computing apparatus may further implement a convolution operation by using the filtering module. Description is provided by using an example in which the optical computing apparatus performs a convolution operation on a ninth group of optical signals.

The linear operation module 100 may receive the ninth group of optical signals and fourth electrical signals, and modulate the ninth group of optical signals based on the fourth electrical signals to output a tenth group of optical signals.

The filtering module receives the tenth group of optical signals, filters out an invalid signal from the tenth group of optical signals, and outputs an eleventh group of optical signals. The eleventh group of optical signals is used to indicate a computing result that is obtained after a convolution operation is performed on a third computing result.

Figure 19:
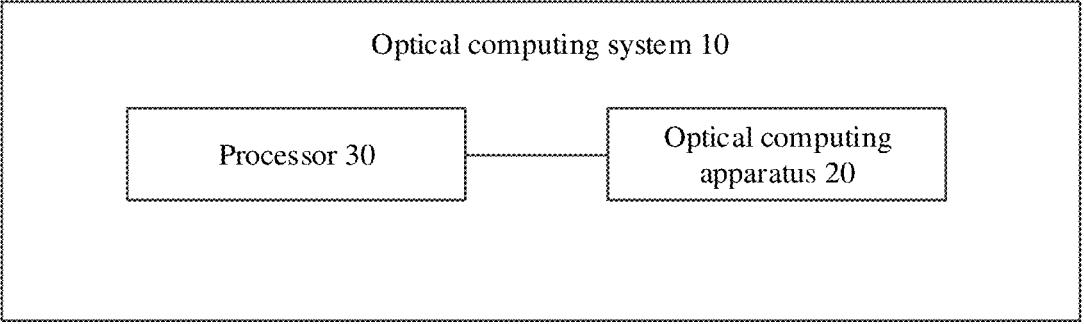
FIG. 19 shows an optical computing system according to this application.

An embodiment of this application further provides an optical computing system. The optical computing system includes a processor and the optical computing apparatus mentioned in the foregoing content. Referring to FIG. 19, an optical computing system 10 includes an optical computing apparatus 20 and a processor 30. The processor 30 and the optical computing apparatus 20 may be connected by using a standard host interface, a network interface, or the like. For example, the host interface may include a peripheral component interconnect express (PCIE) interface. The processor 30 may send to-be-computed data to the optical computing apparatus 20. The data includes a first group of data, and may further include first weights. The data may alternatively be a second group of data and second weights. After receiving the data, the optical computing apparatus 20 may determine one or more corresponding groups of optical signals (for example, a first group of optical signals, a third group of optical signals, and a ninth group of optical signals) and electrical signals (for example, first electrical signals, second electrical signals, and fourth electrical signals) based on the data, and complete a corresponding computing process.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a special-purpose computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

The computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

The computer program instructions may be loaded onto the computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

It is clear that a person skilled in the art can make various modifications and variations to this application without departing from the spirit and scope of this application. This application is intended to cover these modifications and variations of this application provided that they fall within the scope of protection defined by the claims of this application and equivalent technologies thereof.

What is claimed is:

1. An optical computing apparatus, comprising:
a linear operation processor, configured to:
separately receive a first group of optical signals and a third group of optical signals, wherein the first group of optical signals and the third group of optical signals indicate a first group of data;
receive first electrical signals that indicate a first part of first weights, and modulate the first group of optical signals based on the first electrical signals to output a second group of optical signals, wherein the second group of optical signals indicates a computing result of the first group of data and the first part of the weights, and the first weights are weights of a first neural network layer; and
receive second electrical signals that indicate a second part of the first weights, and modulate the third group of optical signals based on the second electrical signals to output a fourth group of optical signals, wherein the fourth group of optical signals indicates a computing result of the first group of data and the second part of the weights;
a first delayer, configured to adjust a delay of the second group of optical signals; and
a coupler, configured to combine the delayed second group of optical signals and the fourth group of optical signals into a fifth group of optical signals, wherein the fifth group of optical signals indicates a first computing result that is obtained after multiply-add operations are performed on the first group of data and the first part of the weights and on the first group of data and the second part of the weights.

2. The optical computing apparatus according to claim 1, wherein
the linear operation processor is further configured to:
receive a sixth group of optical signals, wherein the sixth group of optical signals indicates a second computing result that is obtained after a multiply-add operation is performed on the first group of data and the first weights, and the second computing result comprises the first computing result; and
receive third electrical signals that indicate second weights, and modulate the sixth group of optical signals based on the third electrical signals to output a seventh group of optical signals, wherein the second weights are weights of a second neural network layer; and
the optical computing apparatus further comprises:
a filter, configured to: receive the seventh group of optical signals, filter out an invalid signal from the seventh group of optical signals, and output an eighth group of optical signals, wherein the eighth group of optical signals indicates a computing result that is obtained after a pooling operation is performed on the second computing result.

3. The optical computing apparatus according to claim 2, wherein
the linear operation processor is further configured to:
receive a ninth group of optical signals, wherein the ninth group of optical signals indicates a second group of data; and
receive fourth electrical signals that indicate third weights, and modulate the ninth group of optical signals based on the fourth electrical signals to output a tenth group of optical signals, wherein the tenth group of optical signals indicates a third computing result that is obtained after a multiply-add operation is performed on the second group of data and the third weights, and the third weights are weights of a third neural network layer; and
the filter is further configured to: receive the tenth group of optical signals, filter out an invalid signal from the tenth group of optical signals, and output an eleventh group of optical signals, wherein the eleventh group of optical signals indicates a computing result that is obtained after a convolution operation is performed on the third computing result.

4. The optical computing apparatus according to claim 3, further comprising:
a nonlinear operation processor, configured to perform a nonlinear operation on the sixth group of optical signals, the fifth group of optical signals, the eighth group of optical signals, or the eleventh group of optical signals, wherein the nonlinear operation is an activation function operation.

5. The optical computing apparatus according to claim 1, further comprising:
a dual-mode beam splitter, configured to: receive a twelfth group of optical signals that indicates the first group of data, and split the twelfth group of optical signals into the first group of optical signals and the third group of optical signals.

6. The optical computing apparatus according to claim 5, further comprising a second delayer, wherein
the dual-mode beam splitter is further configured to transmit the delayed second group of optical signals to the second delayer; and
the second delayer is further configured to adjust a delay of the second group of optical signals, so that the second group of optical signals and the fourth group of optical signals simultaneously arrive at the coupler.

7. The optical computing apparatus according to claim 1, wherein the linear operation processor comprises N optoelectronic modulators, and
each of the N optoelectronic modulators is configured to: receive one optical signal in the first group of optical signals and one of the first electrical signals that indicate the first part of the weights, and modulate the received optical signal based on the received electrical signal.

8. The optical computing apparatus according to claim 7, wherein the linear operation processor further comprises N phase modulators and at least (N−1) phase locking modules;
one of the N phase modulators is connected to one of the N optoelectronic modulators, and is configured to adjust a phase of one optical signal that is in the first or second group of optical signals and that is modulated by the phase modulator; and one of the phase locking modules is connected to two of the N phase modulators, and is configured to lock phases of two optical signals that are in the first or second group of optical signals and that are modulated by a two phase modulators.

9. The optical computing apparatus according to claim 3, wherein the linear operation processor further comprises:

an amplifier, configured to amplify powers of the fifth group of optical signals, the sixth group of optical signals, the eighth group of optical signals, or the eleventh group of optical signals.

10. A computing method, applied to an optical computing apparatus, wherein the optical computing apparatus comprises a linear operation processor, first delayer, and a coupler, and the method comprises:

receiving, by the linear operation processor, a first group of optical signals and first electrical signals, wherein the first group of optical signals indicates a first group of data, and the first electrical signals indicate a first part of first weights; and modulating the first group of optical signals based on the first electrical signals to output a second group of optical signals, wherein the second group of optical signals indicates a computing result of the first group of data and the first part of the weights, and the first weights are weights of a first neural network layer;

receiving, by the linear operation processor, a third group of optical signals and second electrical signals, wherein the third group of optical signals indicates the first group of data, and the second electrical signals indicate a second part of the first weights; and modulating the third group of optical signals based on the second electrical signals to output a fourth group of optical signals, wherein the fourth group of optical signals indicates a computing result of the first group of data and the second part of the weights;

adjusting, by the first delayer, a delay of the second group of optical signals; and combining, by the coupler, the delayed second group of optical signals and the fourth group of optical signals into a fifth group of optical signals, wherein the fifth group of optical signals indicates a first computing result that is obtained after multiply-add operations are performed on the first group of data and the first part of the weights and on the first group of data and the second part of the weights.

11. The computing method according to claim 10, wherein the optical computing apparatus further comprises a filter, and the method further comprises:

receiving, by the linear operation processor, a sixth group of optical signals, and third electrical signals that indicate second weights, wherein the sixth group of optical signals indicates a second computing result that is obtained after a multiply-add operation is performed on the first group of data and the first weights, the second computing result comprises the first computing result, and the second weights are weights of a second neural network layer;

modulating, by the linear operation processor, the sixth group of optical signals based on the third electrical signals to output a seventh group of optical signals; and receiving, by the filter, the seventh group of optical signals, filtering out an invalid signal from the seventh group of optical signals, and outputting an eighth group of optical signals, wherein the eighth group of optical signals indicates a computing result that is obtained after a pooling operation is performed on the second computing result.

12. The computing method according to claim 11, further comprising:

receiving, by the linear operation processor, a ninth group of optical signals, wherein the ninth group of optical signals indicates a second group of data;

receiving, by the linear operation processor, fourth electrical signals indicating third weights, and modulating the ninth group of optical signals based on the fourth electrical signals to output a tenth group of optical signals, wherein the tenth group of optical signals indicates a third computing result that is obtained after a multiply-add operation is performed on the second group of data and the third weights, and the third weights are weights of a third neural network layer; and receiving, by the filter, the tenth group of optical signals, filtering out an invalid signal from the tenth group of optical signals, and outputting an eleventh group of optical signals, wherein the eleventh group of optical signals indicates a computing result that is obtained after a convolution operation is performed on the third computing result.

13. An optical computing system, comprising a processor and an optical computing apparatus connected to the processor, wherein the optical computing apparatus comprises a linear operation processor, configured to:

separately receive a first group of optical signals and a third group of optical signals, wherein the first group of optical signals and the third group of optical signals indicate a first group of data, receive first electrical signals that indicate a first part of first weights, and modulate the first group of optical signals based on the first electrical signals to output a second group of optical signals, wherein the second group of optical signals indicates a computing result of the first group of data and the first part of the weights, and the first weights are weights of a first neural network layer; and receive second electrical signals that indicate a second part of the first weights, and modulate the third group of optica signals based on the second electrical signals to output a fourth group of optical signals, wherein the fourth group of optical signals indicates a computing result of the first group of data and the second part of the weights, a first delayer, configured to adjust a delay of the second group of optical signals, and a coupler, configured to combine the delayed second group of optical signals and the fourth group of optical signals into a fifth group of optical signals, wherein the fifth group of optical signals indicates a first computing result that is obtained after multiply-add operations are performed on the first group of data and the first part of the weights and on the first group of data and the second part of the weights, and wherein the processor of the optical computing system is configured to send to-be-computed data to the optical computing apparatus, and the data comprises the first group of data.

14. The optical computing system according to claim 13, wherein the linear operation processor is further configured to:

receive a sixth group of optical signals, wherein the sixth group of optical signals indicates a second computing result that is obtained after a multiply-add operation is performed on the first group of data and the first weights, and the second computing result comprises the first computing result; and receive third electrical signals that indicate second weights, and modulate the sixth group of optical signals based on the third electrical signals to output a seventh group of optical signals, wherein the second weights are weights of a second neural network layer, and the optical computing apparatus further comprises:

a filter, configured to: receive the seventh group of optical signals, filter out an invalid signal from the seventh group of optical signals, and output an eighth group of optical signals, wherein the eighth group of optical signals indicates a computing result that is obtained after a pooling operation is performed on the second computing result.

15. The optical computing system according to claim 14, wherein the linear operation processor is further configured to:

receive a ninth group of optical signals, wherein the ninth group of optical signals indicates a second group of data; and receive fourth electrical signals that indicate third weights, and modulate the ninth group of optical signals based on the fourth electrical signals to output a tenth group of optical signals, wherein the tenth group of optical signals indicates a third computing result that is obtained after a multiply-add operation is performed on the second group of data and the third weights, and the third weights are weights of a third neural network layer, and the filter is further configured to: receive the tenth group of optical signals, filter out an invalid signal from the tenth group of optical signals, and output an eleventh group of optical signals, wherein the eleventh group of optical signals indicates a computing result that is obtained after a convolution operation is performed on the third computing result.

* * * * *